United States Patent
Mosier et al.

(10) Patent No.: US 11,506,847 B2
(45) Date of Patent: Nov. 22, 2022

(54) MODULARIZED INSERT ASSEMBLY FOR BACKPLANE CONNECTOR

(71) Applicant: TE Connectivity Services GmbH, Schaffhausen (CH)

(72) Inventors: James Patrick Mosier, Palmyra, PA (US); Mark Benton, Hoffman Estates, IL (US); Dwight David Zitsch, Carlisle, PA (US)

(73) Assignee: TE CONNECTIVITY SOLUTIONS GmbH, Schaffhausen (CH)

( * ) Notice: Subject to any disclaimer, the term of this patent is extended or adjusted under 35 U.S.C. 154(b) by 0 days.

(21) Appl. No.: 16/936,945

(22) Filed: Jul. 23, 2020

(65) Prior Publication Data

US 2022/0026647 A1 Jan. 27, 2022

(51) Int. Cl.
*G02B 6/38* (2006.01)

(52) U.S. Cl.
CPC ......... *G02B 6/3897* (2013.01); *G02B 6/3883* (2013.01)

(58) Field of Classification Search
None
See application file for complete search history.

(56) References Cited

U.S. PATENT DOCUMENTS

| | | | | |
|---|---|---|---|---|
| 3,668,608 A * | 6/1972 | Ziegler, Jr. | ............. | H01R 24/52 439/248 |
| 6,361,218 B1 * | 3/2002 | Matasek | ............. | G02B 6/3821 385/60 |
| 6,572,276 B1 * | 6/2003 | Theis | ............. | G02B 6/387 385/78 |
| 2009/0257722 A1 * | 10/2009 | Fisher | ............. | G02B 6/3878 385/115 |
| 2012/0128302 A1 * | 5/2012 | Katagiyama | ......... | G02B 6/3879 385/56 |
| 2013/0236142 A1 * | 9/2013 | Fabian | ............. | G02B 6/3885 385/78 |
| 2014/0044395 A1 * | 2/2014 | Waldron | ............. | G02B 6/38 385/60 |
| 2018/0164513 A1 * | 6/2018 | Fabian | ............. | G02B 6/3885 |
| 2018/0299625 A1 * | 10/2018 | Fabian | ............. | G02B 6/4256 |
| 2019/0227245 A1 * | 7/2019 | Miller | ............. | G02B 6/3806 |
| 2019/0229476 A1 * | 7/2019 | Miller | ............. | H01R 9/0527 |

FOREIGN PATENT DOCUMENTS

EP 3 514 889 A1 7/2019
JP 63-151910 A * 6/1988

OTHER PUBLICATIONS

Written opinion for PCT/IB2021/056645, dated Oct. 6, 2021. (Year: 2021).*
International Search Report, International Application No. PCT/IB2021/056645, International Filing Date, Jul. 22, 2021.

* cited by examiner

*Primary Examiner* — Michael Stahl

(57) ABSTRACT

A connector for attachment to a planar surface, said connector comprising a shell housing configured for attachment to said planar surface, an insert housing connected to said shell and defining two or more insert ferrule openings, at least one retainer attached to said insert housing and defining two or more retainer ferrule openings aligned with said insert ferrule openings, and two or more ferrule assemblies disposed within said two or more insert ferrule openings.

19 Claims, 18 Drawing Sheets

MODULARIZED INSERT ASSEMBLY FOR BACKPLANE CONNECTOR

FIELD OF INVENTION

The invention relates, generally, to a backplane connector, and, more specifically, to a backplane connector assembly having a modularized insert assembly.

BACKGROUND

Backplane connectors are well known. Existing fiber optic MT ferrule backplane connectors, such as those based on VITA 66 standards and their derivatives, tend to pose installation challenges. The assembly process involves first installing the connector shell and insert housing sub-assembly on a backplane using connector mounting screws. Next, one or more retainer components are populated with multiple fiber-optic MT cable assemblies. The ferrule assemblies, which are loosely held in the retainers, must then be aligned with their respective cavities in the insert housing and then pushed forward into their respective cavities. Lastly, the retainer is attached to the insert housing.

Keeping the ferrule assemblies and retainers together and aligning them with the insert housing is difficult. The connector cavities contain an internal peripheral step, which is the forward-stop feature for the installed MT ferrules. By design, there is minimal clearance for the MT ferrule to pass this step to control MT ferrule's lateral position. Accordingly, the ferrule must be well-aligned for the MT ferrule mating face to pass by the step to reach its fully-inserted position.

This challenge is further complicated in installations in which the backplane printed wiring board (PWB) connector is not readily visible or accessible, such as when the connector is recessed within an enclosure. In such situations, one must reach inside the enclosure, possibly having to individually populate the MT assemblies in the insert housing, and hold them in place until the retainers are secured. This can be particularly difficult with a multi-cavity connector, such as the TE 7-cavity derivative design. Moreover, in these blind-assembly installations, the MT ferrule assembly is typically pushed by its cable through the insert housing cavity using the installed flexible fiber optic cable assembly. However, the flexibility of the cable often makes pushing the MT ferrule past the step feature difficult. Accordingly, in such a blind-assembly installations, one risks damaging the MT ferrule mating face and possibly the optical fiber cable assembly.

An additional complication in backplane connector installation is the need for the insert housing to float within the connector shell. Specifically, a feature of the VITA 66 backplane connector is that the insert housing sub-assembly floats laterally (in-plane, parallel to the backplane PWB) relative to the connector shell, which is fixed to the PWB. This enhances the blind-mating capability of the connector. Existing backplane connectors are designed such that insert housing sub-assembly is sandwiched between the connector shell and the backplane, with clearance, to achieve the float capability. The space constraints of new standardized backplane cutouts, such as per VITA 67.3-C, introduce new challenges to engineer a properly-supported floating insert housing when compared to the existing connector footprints on the PWB. Specifically, to provide both the clearance for the insert housing to float and the support to prevent backward axial movement, the rectangular cutout in the backplane is tightly-toleranced, which increases the cost to manufacture the PWB. If the cutout is undersize, it may restrict the insert housing float capability, which could impede the blind-mating engagement. Conversely if the cutout is oversize, the insert housing may bind within the cutout or dislodge from it. Additionally, there is risk the floating insert housing may abrade the backplane.

Therefore, Applicants have identified the need for a backplane connector that facilitates blind-assembly installation yet provides adequate float to facilitate blind mating. The present invention fulfills these needs among others.

SUMMARY OF INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

The invention facilitates the installation of backplane connector assemblies in blind-assembly situations by providing a modularized insert assembly that can be pre-assembled on a benchtop or other convenient place outside the system enclosure prior to its connection to the shell housing. Once assembled, the modularized insert assembly is then readily installable and secured into the shell housing mounted on the backplane within the system enclosure. This approach not only facilitate installation, but also reduces the risk of damaging the fiber optic cable assemblies and ferrule mating face due to shop handling.

Accordingly, in one embodiment, the present invention relates to connector assembly mounted on a planar surface. In one embodiment, the connector assembly comprises: (a) a shell housing configured for attachment to said planar surface; (b) an insert housing connected to said shell housing and defining two or more insert ferrule openings; (c) at least one retainer attached to said insert housing and defining two or more retainer ferrule openings aligned with said insert ferrule openings; and (d) two or more ferrule assemblies disposed within said two or more insert ferrule openings.

In another embodiment, the present invention relates to a modularized insert assembly for connection to a shell housing mounted on a planar surface. In one embodiment the modularized insert assembly comprises: (a) an insert housing configured to be floatably mounted within said shell housing, said insert housing defining two or more insert ferrule openings; (b) at least one retainer attached to said insert housing and defining two or more retainer ferrule openings aligned with said insert ferrule openings; and (d) two or more ferrule assemblies disposed within said two or more insert ferrule openings.

In yet another embodiment, the present invention relates to a method of reassembling a modularized insert assembly prior to installing the modularized insert assembly into a shell housing mounted on a planar surface. In one embodiment, the method comprises: (a) disposing two or more ferrule assemblies in said two or more insert ferrule openings; (b) connecting at least one retainer to said insert housing to form a modularized insert assembly; and (c) disposing said modularized insert assembly in said shell housing.

DETAILED DESCRIPTION

Figure 1A:
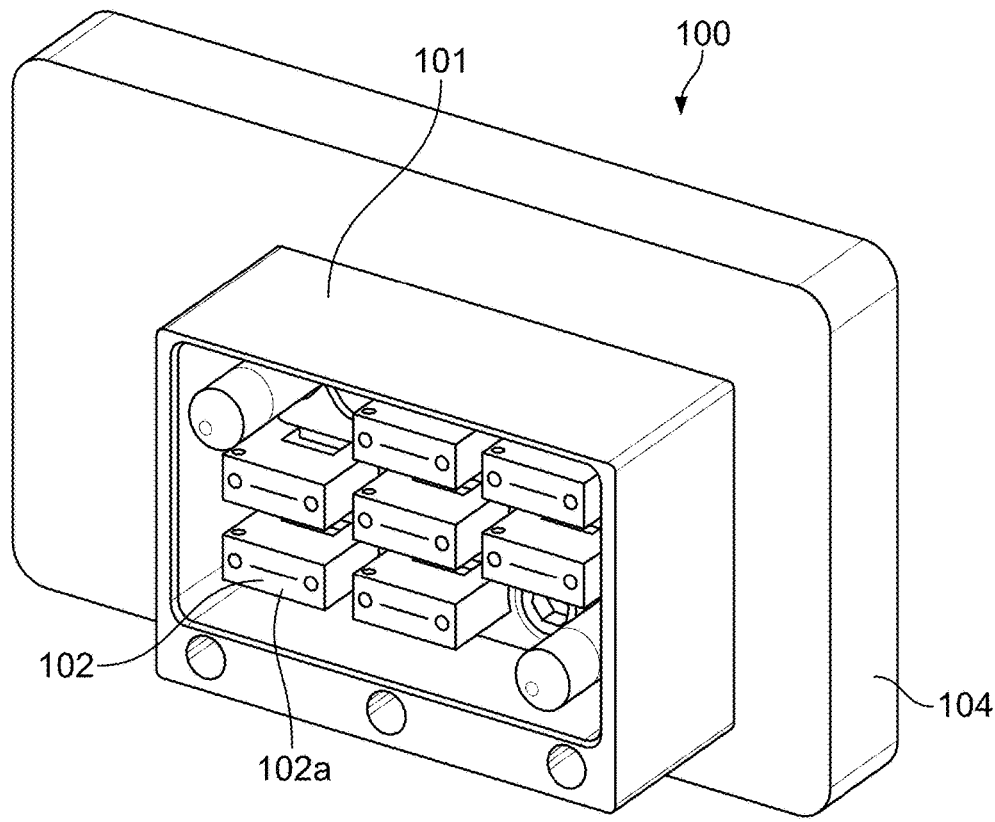
FIGS. 1A and 1B show front and rear perspective views respectively of a prior art plug connector assembly mounted on a backplane.
Figure 1B:
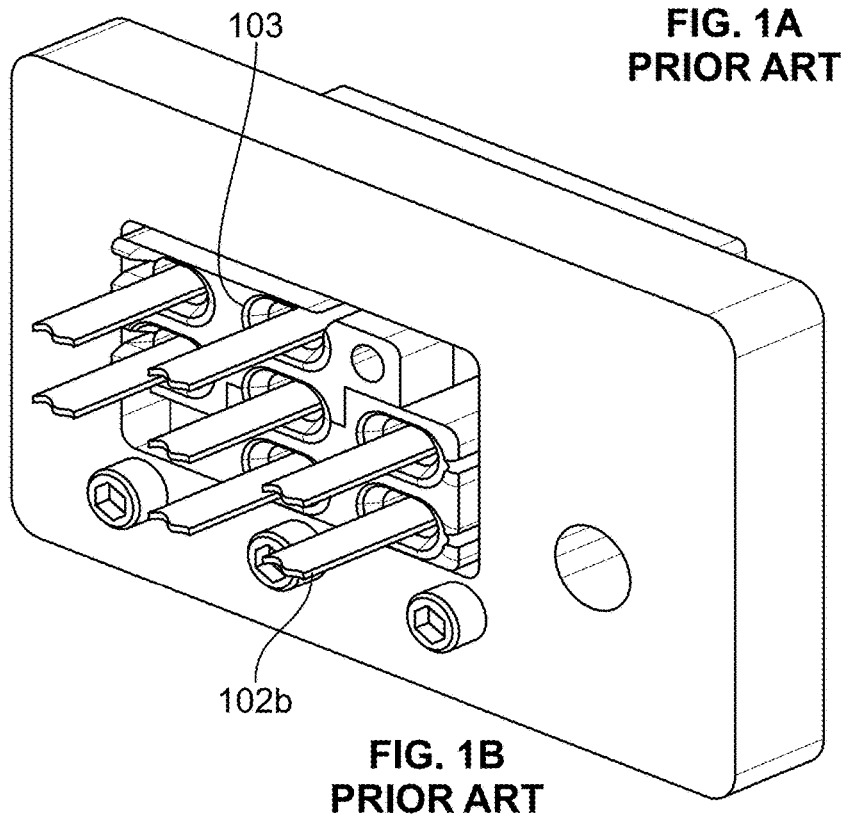
Figure 2A:
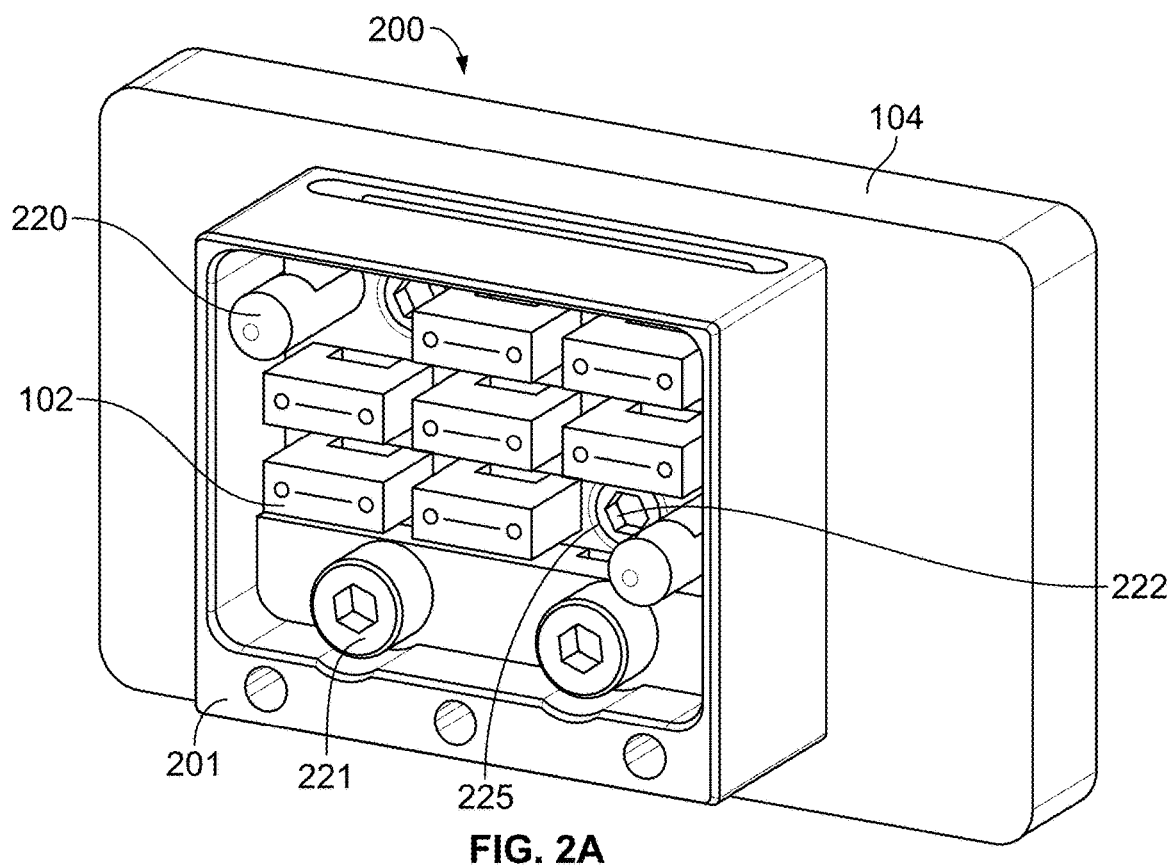
FIGS. 2A and 2B show front and rear perspective views respectively of one embodiment of the connector assembly of the present invention mounted on a backplane.

Referring to FIGS. 2A and B, and 3A and B, one embodiment of connector assembly 200 of the present invention is shown. In this embodiment, the connector assembly comprises a shell housing 201 configured for attachment to the planar surface 104, such as, for example, a backplane. The connector assembly also comprises an insert housing 331 connected to the shell, and defining two or more insert ferrule openings 336, and two insert housing alignment pin openings 334. The connector assembly further comprises at least one retainer 203 attached to the insert housing, and defining two or more retainer ferrule openings 236, and at least two retainer fastener openings 442 (see FIG. 4B). In one embodiment, to align and secure the insert housing and retainer, two captive screws 222 are disposed in the insert housing and retainer fastener openings, thereby securing the retainer to the insert housing, and aligning the insert ferrule openings and the retainer ferrule openings. Two or more ferrule assemblies 102 are disposed in the insert ferrule openings 336.

As mentioned above, one embodiment of the connector of the present invention facilitates "pre-assembly" of the ferrule assemblies remote from the backplane, i.e., outside of the backplane environment and prior to the installation of the insert housing in the housing shell. That is, as described above, trying to insert ferrule assemblies into ferrule openings in a housing shell that is mounted to the backplane can be problematic, if not impossible, in a blind-assembly or limited space situation. Therefore, the present invention provides a mechanism to essentially preload the ferrule assemblies in a modularized insert assembly and then take this modularized insert assembly and install it, as a whole, in the housing shell in one step.

Figure 3A:
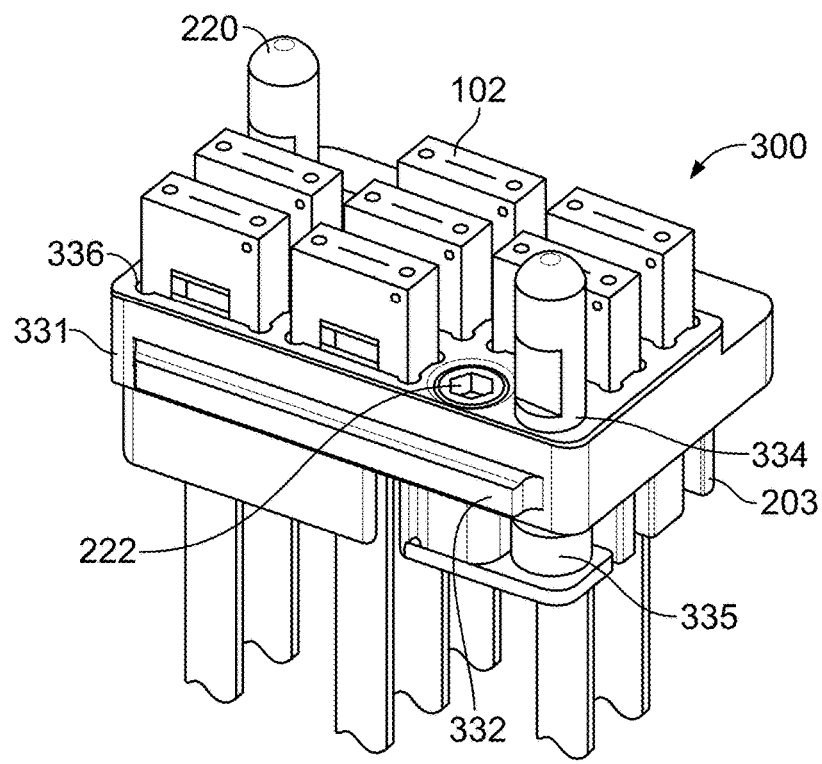
FIG. 3A shows the modularized insert assembly of the embodiment of connector assembly shown in FIGS. 2A and 2B.
Figure 3B:
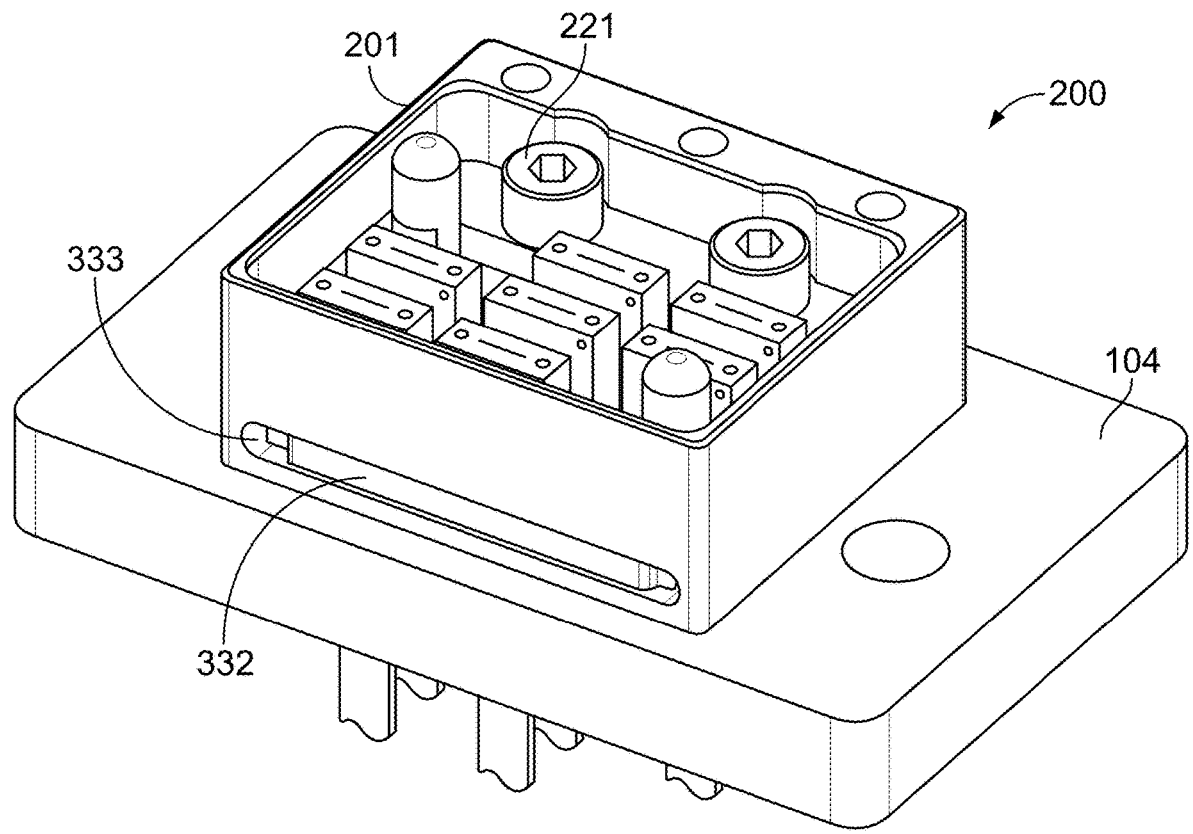
FIG. 3B shows the modularized insert assembly of FIG. 3 installed in the shell housing mounted on a backplane to form the connector assembly of FIG. 2A.

To this end, an important component of the connector assembly 200 is the modularized insert assembly 300 as shown in FIG. 3A. In one embodiment, the modularized insert assembly 300 comprises an insert housing 331 which is configured for attachment to a shell housing, and defines two or more insert ferrule openings 336, and two or more insert housing alignment pin openings 334. In one embodiment, the insert housing comprises fastener openings 225 to accept at least two captive screws 222. At least one retainer 203 is attached to the insert housing and defines two or more retainer ferrule openings 236. In one embodiment, the retainer comprises at least two retainer fastener openings 442 (see FIG. 4B). The insert housing and retainer are aligned with at least two captive screws 222, each captive screw disposed in one of the insert housing fastener openings and in one of the retainer fastener openings, thereby aligning the insert ferrule openings and the retainer ferrule openings. Two or more ferrule assemblies 102 are disposed within the two or more insert ferrule openings.

One embodiment of the invention is the process of preparing the modularized insert assembly 300 prior to mounting it in the shell housing mounted to the planar surface. In one embodiment, the process comprises disposing two or more ferrule assemblies 102 in the two or more insert ferrule openings 336, and then connecting at least one retainer 203 to the insert housing to form the modularized insert assembly 300. After the modularized insert assembly 300 is prepared, then the process comprises disposing the modularized insert assembly in the shell housing mounted to a planar surface, such as a backplane.

These features are described below in greater detail and with respect to selected alternative embodiments.

Figure 4C:
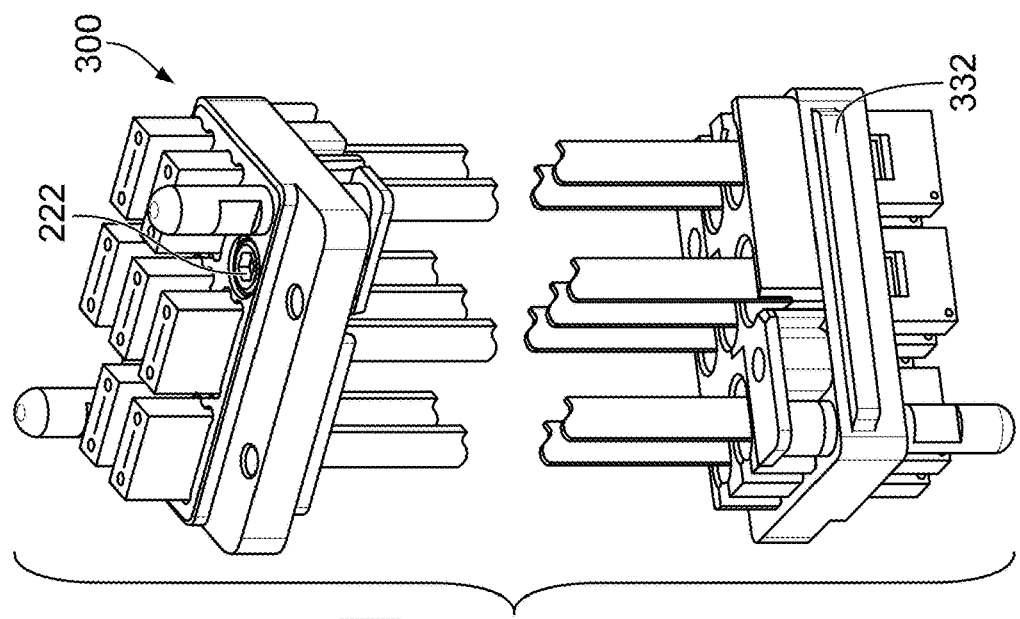
FIGS. 4A-4G show the various steps of one embodiment of preparing the connector assembly of FIG. 2A mounted on a backplane.
Figure 4B:
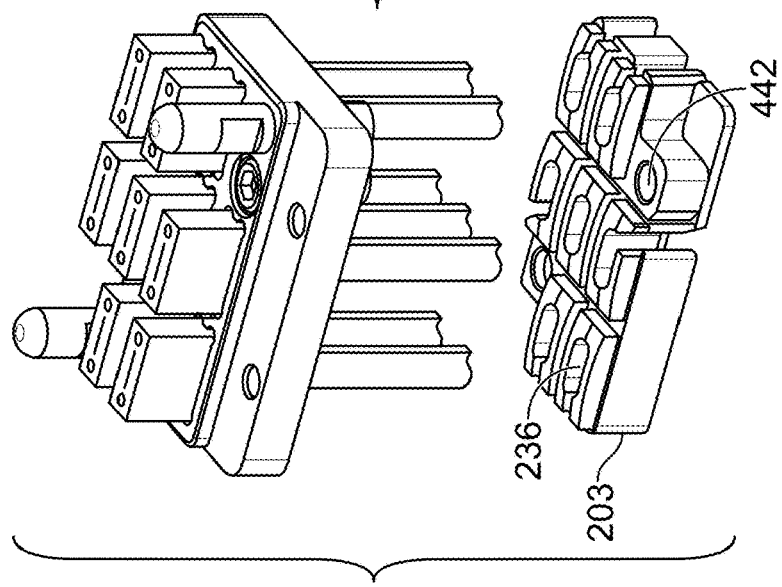
Figure 4A:
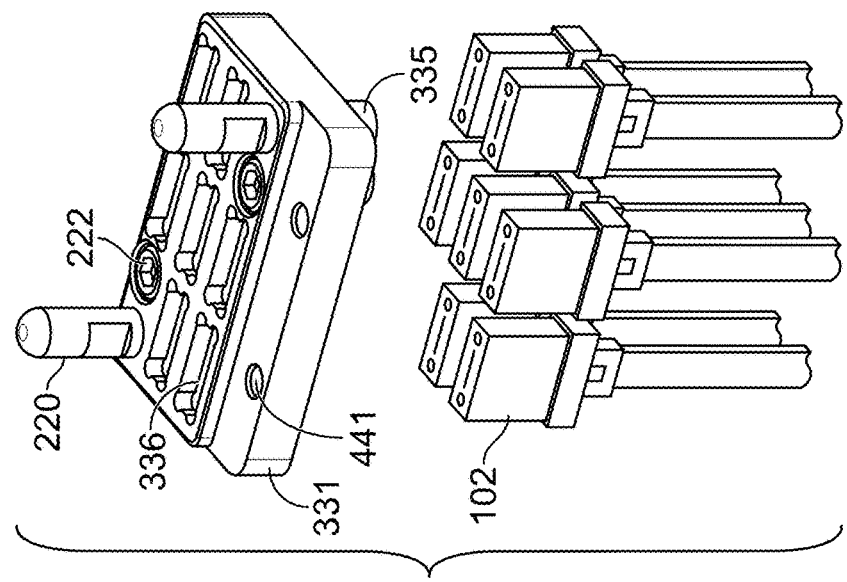
Figure 4E:
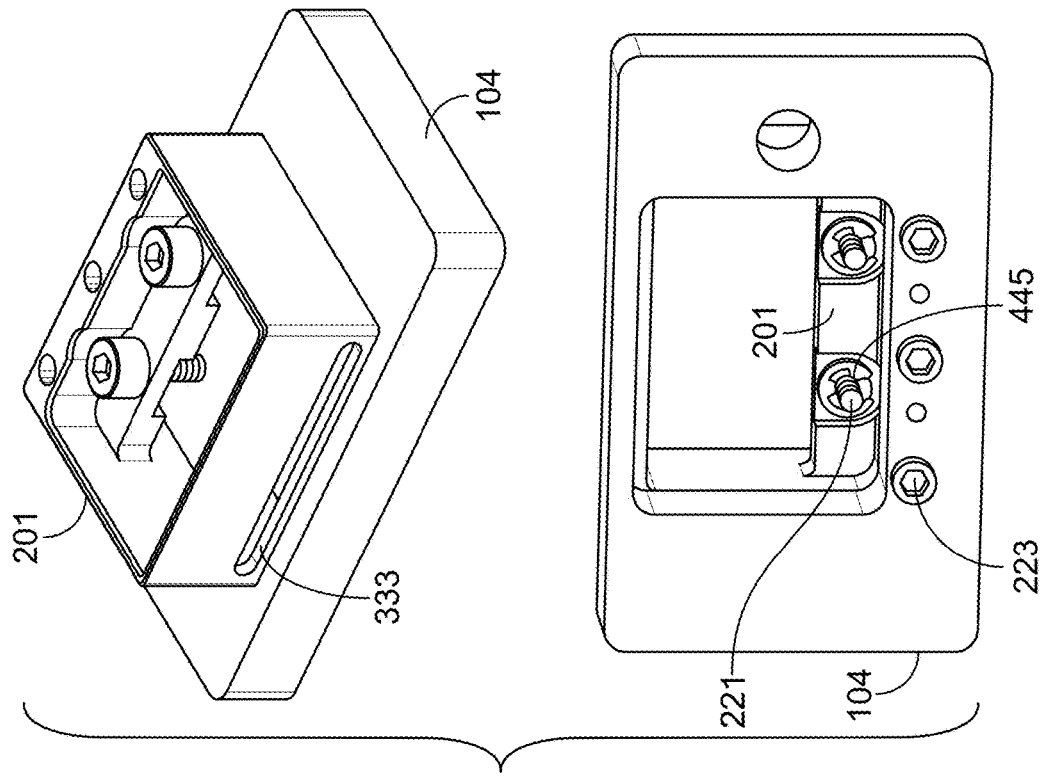
Figure 4D:
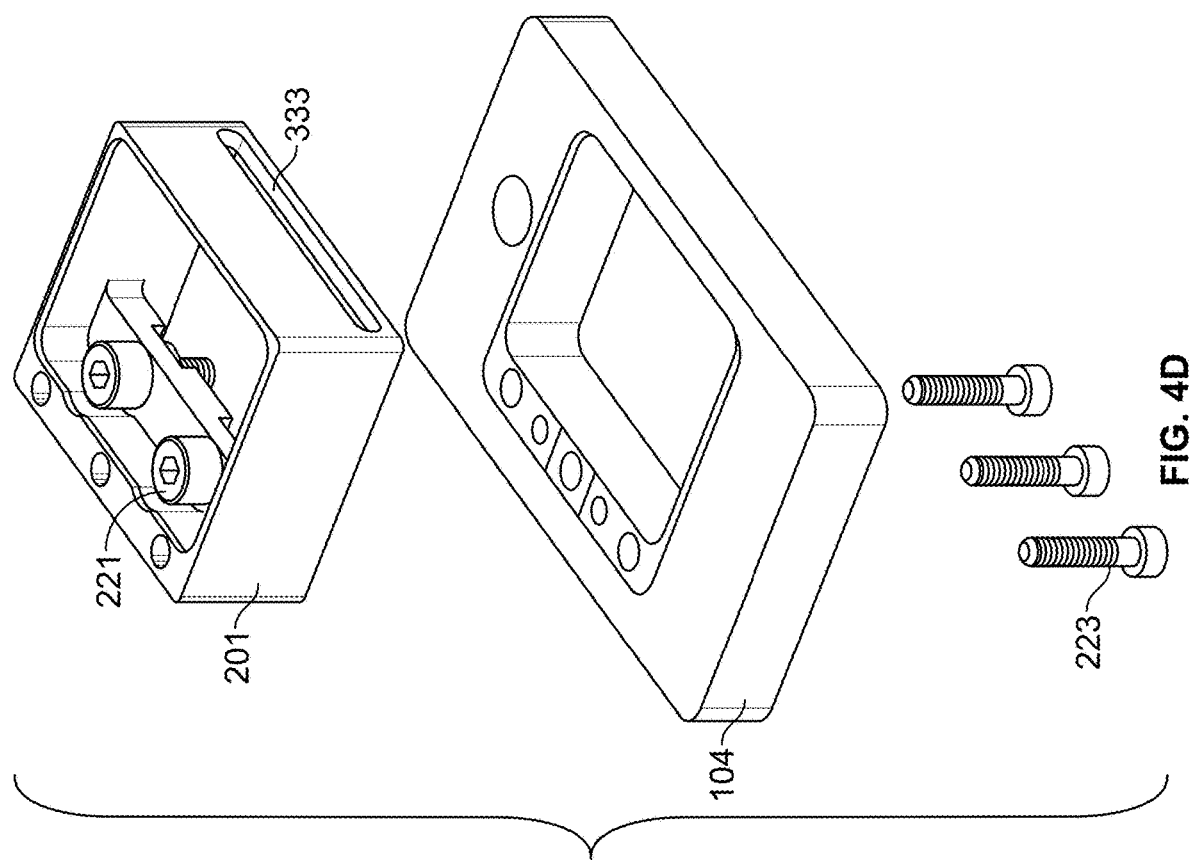

Referring to FIGS. 4A-4G, one embodiment of the process for preparing the modularized insert assembly and attaching it to the housing shell mounted on the planar surface is disclosed. As shown In FIG. 4A, a plurality of ferrule assemblies 102 are disposed in insert ferrule openings 336 defined in insert housing 331. In this particular embodiment, the ferrule assemblies are inserted into the insert ferrule openings from rear to front. Also, as shown in FIG. 4A, the insert housing comprises alignment holes 334 in which are disposed alignment pins 220. In this embodiment, the alignment pins 220 are held in place by fasteners 335.

Next, as shown in FIG. 4B, the cables 102b of the ferrule assemblies 102 are slipped into the retainer ferrule openings 236 of the retainer 203. It should be understood that retainer configurations may vary. For example, it may comprise a unitary component for accommodating two or three ferrule assemblies, or it may comprise multiple components for accommodating a large number of ferrule assemblies such as disclosed in U.S. Pat. No. 10,359,579. In this particular embodiment, the retainer 203 has a two-component configuration. In one embodiment, the retainer is aligned with the insert housing 331 by aligning the retainer fastener holes 442 with the insert fastener holes 225, and fastening the retainer 203 to the rear of the insert housing 331 using captive fasteners 222 of the insert housing, thus forming the modularized insert assembly 300 as shown in FIG. 4C.

In one embodiment, the attachment of the housing shell 201 to the planar surface 104 is performed independently of preparing the modularized insert assembly 300. For example, referring to FIG. 4D and FIG. 4E, the shell housing 201 is fastened to the planar surface 104 using one or more fasteners 223. To aid in the alignment of the shell housing 201 on the planar surface 104A, a series of locating protrusions/recesses on the shell housing and planar surface may be used.

Figure 5A:
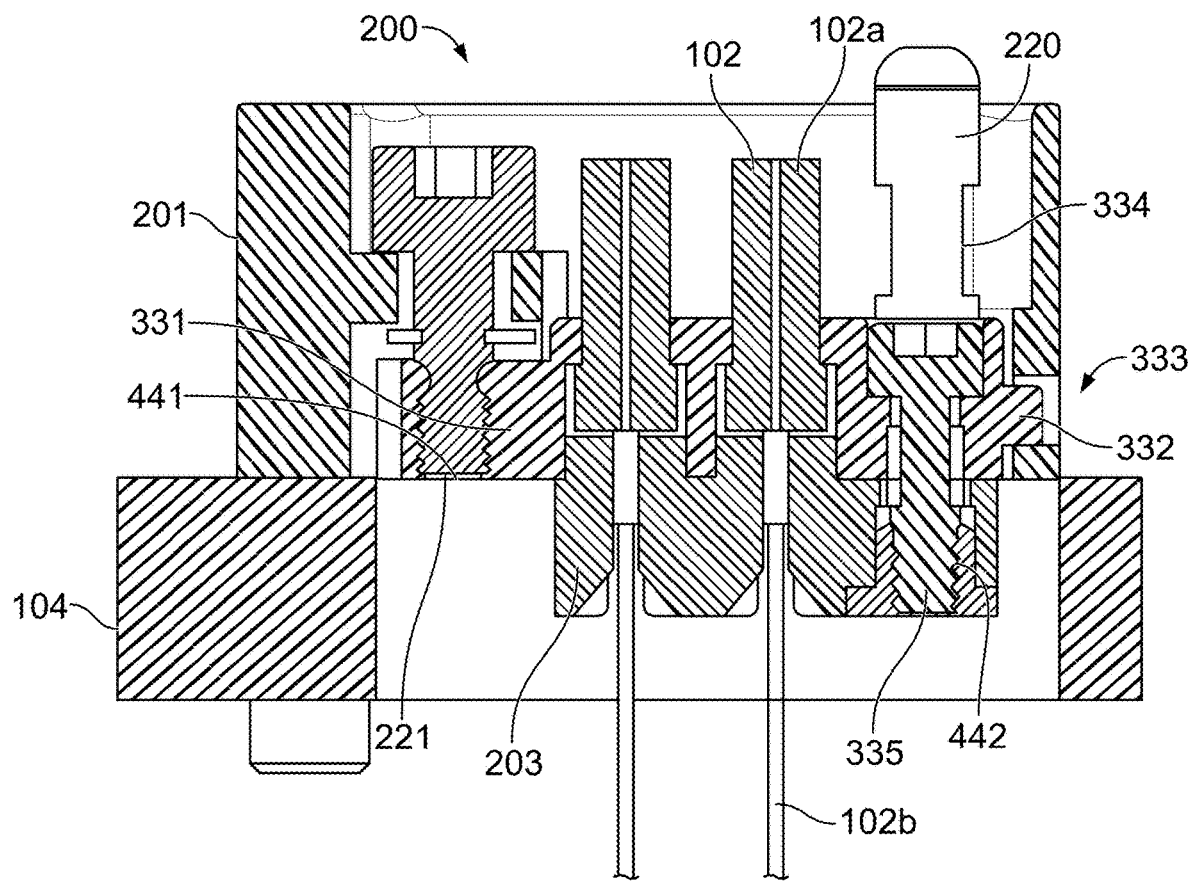
FIG. 5A shows a cross-sectional side view of the connector assembly of FIG. 2A.

Referring to FIG. 5A, a cross-sectional view a side cross-sectional view of the mounted connector assembly 200 is shown indicating the various features described above.

Figure 5B:
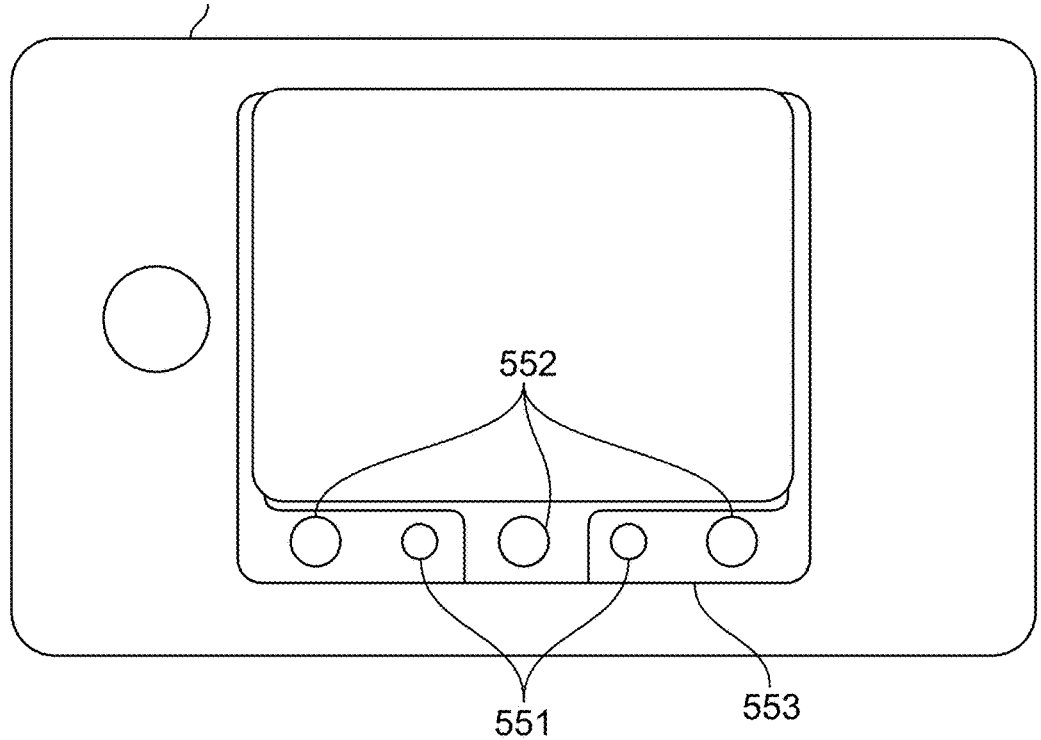
FIG. 5B shows one embodiment of a backplane to which the connector assembly of FIG. 2A is mounted.

FIG. 5B shows a typical planar surface suitable first the receiving the shell housing as described above. In this particular embodiment, the planar surface 104 is a portion of the backplane having a VITA-standard cutout with mounting holes 552 and locating holes 551. As mentioned above, in this embodiment, the locating holes 551 are configured to receive protrusions on the shell housing to locate the shell housing precisely on the backplane. It should be noted that, although the connector assembly 200 is shown in combination with a backplane, other embodiments are possible in which the connector assembly 200 attaches to any planar surface.

Figure 4G:
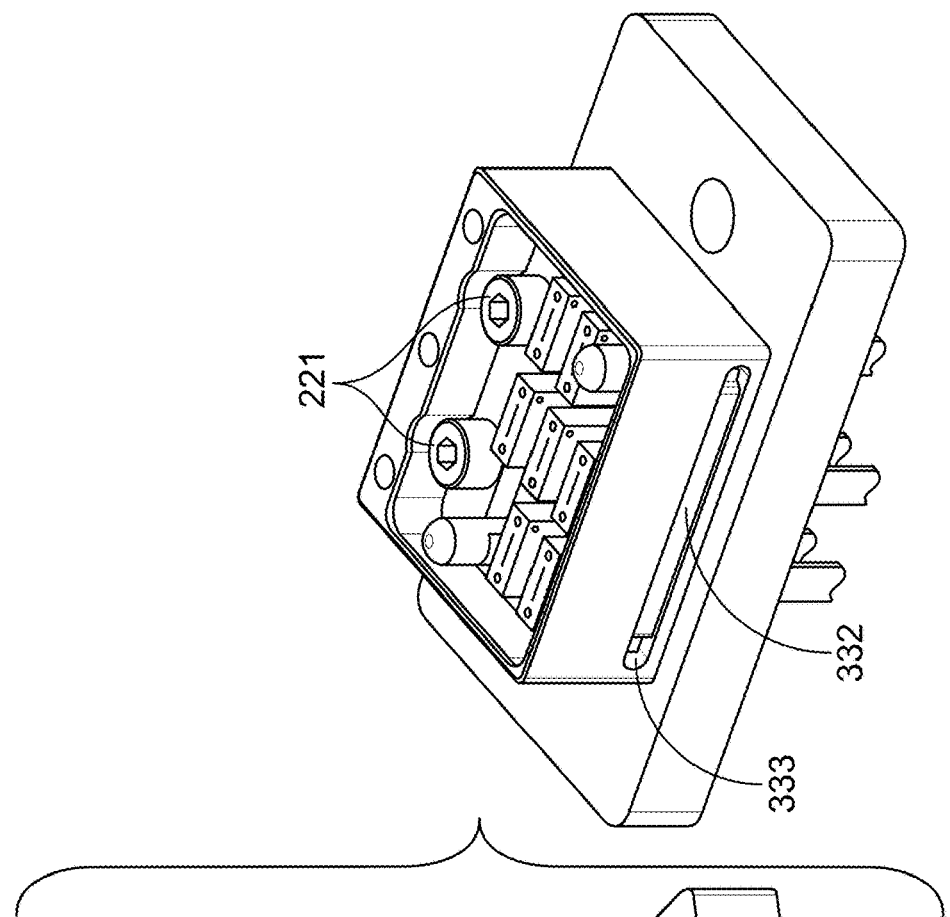
Figure 4F:
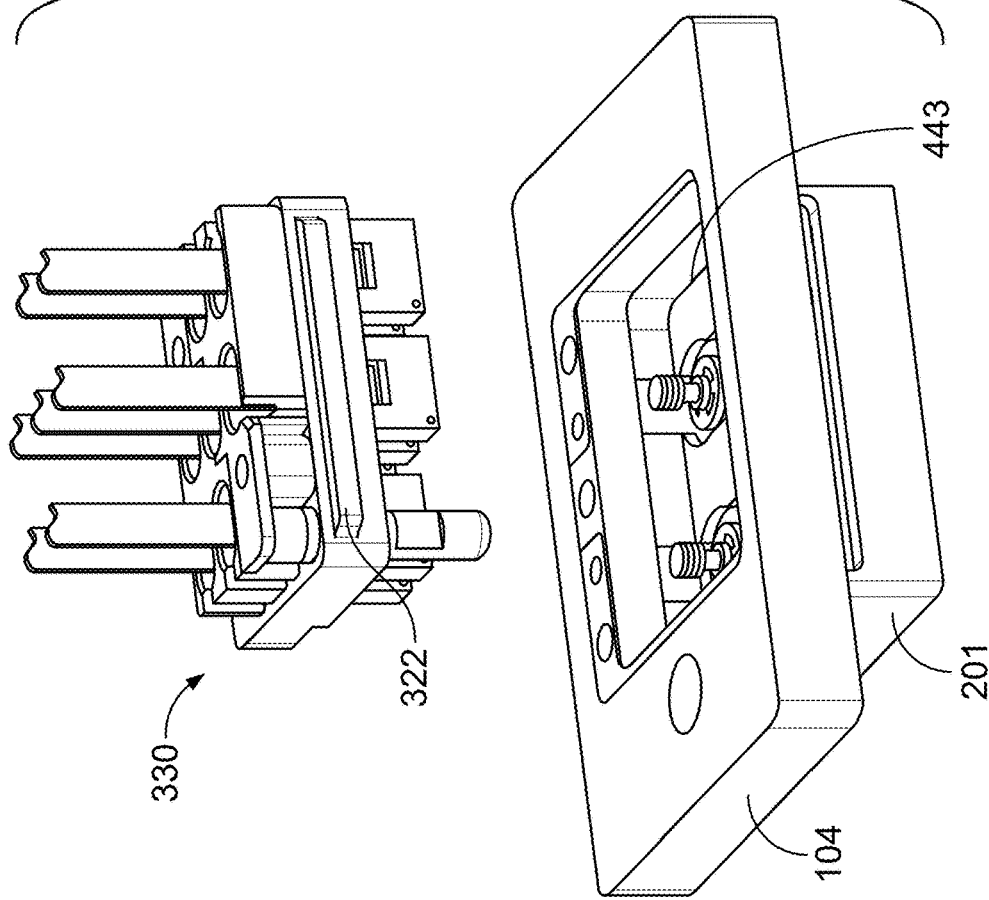

Referring to FIG. 4F, in this step, the modularized insert assembly 300 is connected to the shell housing 201. Specifically, the modularized insert housing 300 is inserted from the rear of the shell housing 201, through an opening 443 in the planar surface 104 as shown in FIG. 4F. In this particular embodiment, as shown in FIG. 4G, the insert housing 331 has a ridge 332 which is inserted in the slot 333 and the shoulder screws 221 are fastened to the insert housing to secure it in place.

The modularized insert assembly 300 is configured to float within the shell housing. As used herein, the term float or floatably mounted refers to the configuration of the insert housing within the shell housing in which the insert housing is able to move laterally within the shell housing with respect to the optical axis. In this particular embodiment, floatably mounted means the insert housing is capable of moving in the XY direction, essentially parallel to the plane of the planar surface. Having the insert housing floatably mounted within the shell allows the insert housing to move laterally with respect to the optical axis to facilitate compliance in the connector, enabling it to align with a mating connector during blind mating.

Figure 2B:
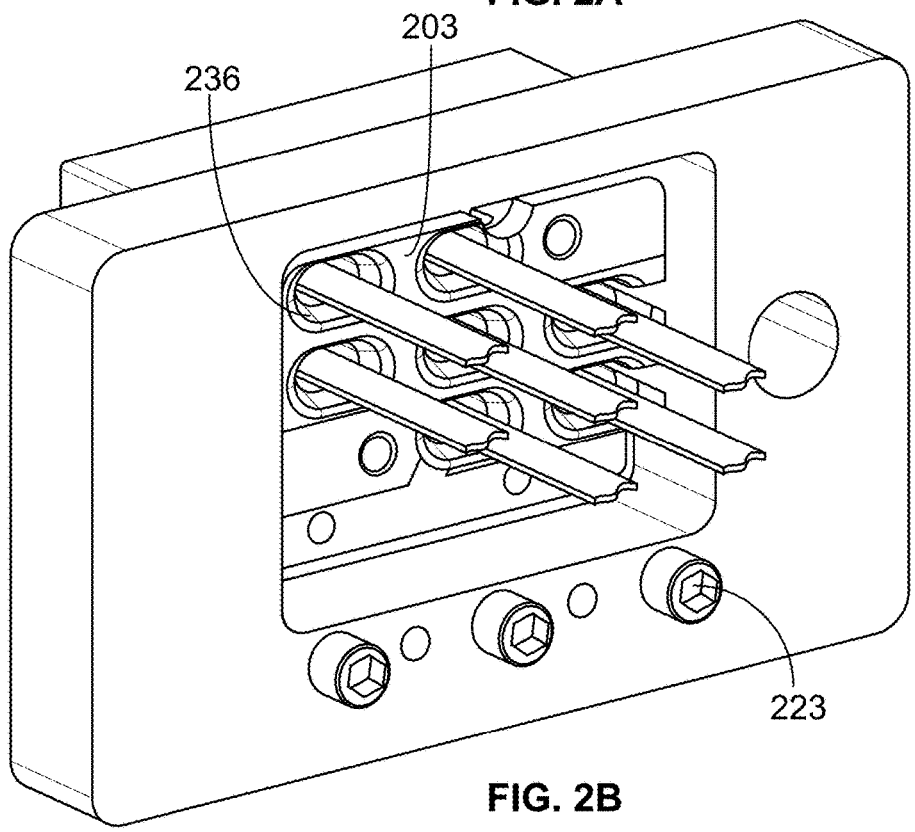

Various configurations for floatably mounting the insert housing within the shell housing are possible. For example, in the embodiment of the connector assembly 200 shown in FIGS. 2A, 2B and 4E, the float is achieved by having a flange 332 of the insert housing 331 supported by the slot 333, while having the opposing side of the insert housing held in place by shoulder screws 221. Because the ridge is disposed but not connected in the slot, the ridge/slot configuration prevents axial movement, but allows lateral movement between the insert housing and the shell housing. Likewise, the shoulder screws can move laterally within the shell housing but restrain the insert housing from moving axially relative to the shell housing. More specifically, referring back to FIG. 4E, the shoulder screws 221 are held in place by a backing washer 445 as shown, thereby allowing the screws 221 to be disposed within oversized borehole in the shell housing, thereby allowing the screw to move within the larger borehole. Thus, in this configuration, the ridge 332 is able to move laterally within the slot 333, and, likewise, the shoulder screws are able to move laterally within the oversized boreholes. Because movement is permitted at each connection between the insert housing and the shell housing, the insert housing can move laterally with respect to the shell housing. Moreover, because the shell housing fully supports and provides the float capability for the modularized insert housing, there is no reliance on the backplane PWB to support the insert housing, which prevents the PWB-abrasion risk and avoids the sensitivity to the cutout size.

As mentioned above, this is just one embodiment of the insert housing being floatable mounted within the shell housing. Other configurations are described below in connection with the embodiment of FIG. 6.

It should be understood that other embodiments of the modularized insert assembly of the present invention being floatably mounted to the shell housing are possible. For example, referring to FIGS. 6A, 6B, 7A and 7B, an alternative embodiment of the connector assembly 600 and the modularized insert assembly 700 of the present invention are shown. Specifically, referring to FIG. 6A, the connector assembly 600 is similar to that of connector assembly 200, except that the mechanism for floatably mounting the insert housing in the shell housing 601 is different. In this embodiment, the mechanism for floatably mounting the insert housing to the shell housing relies on a bracket 661 for preventing the axial movement of the insert housing by abutting a shoulder 770 on the insert housing. More specifically, referring to FIG. 6A, the shell housing 601 comprises a bracket 661 and locking screw 662, and, referring to FIG. 7A, the insert housing 730 of the modularized insert assembly 700 comprises a shoulder 770 to cooperate with the bracket 661. This mechanism is described in greater detail below in connection with the components of the connector assembly shown in FIGS. 8A-8C, and the assembly process shown in FIGS. 9A-J.

Figure 6A:
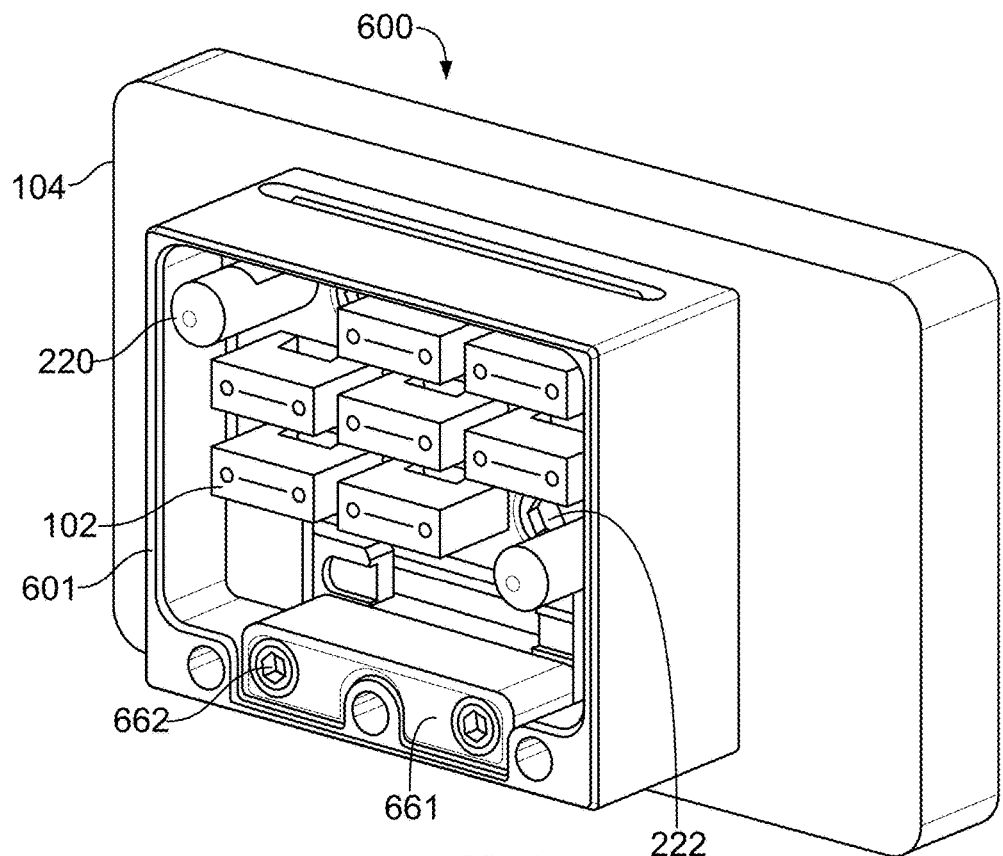
FIGS. 6A and 6B show front and rear perspective views, respectively, of another embodiment of the connector assembly of the present invention.
Figure 6B:
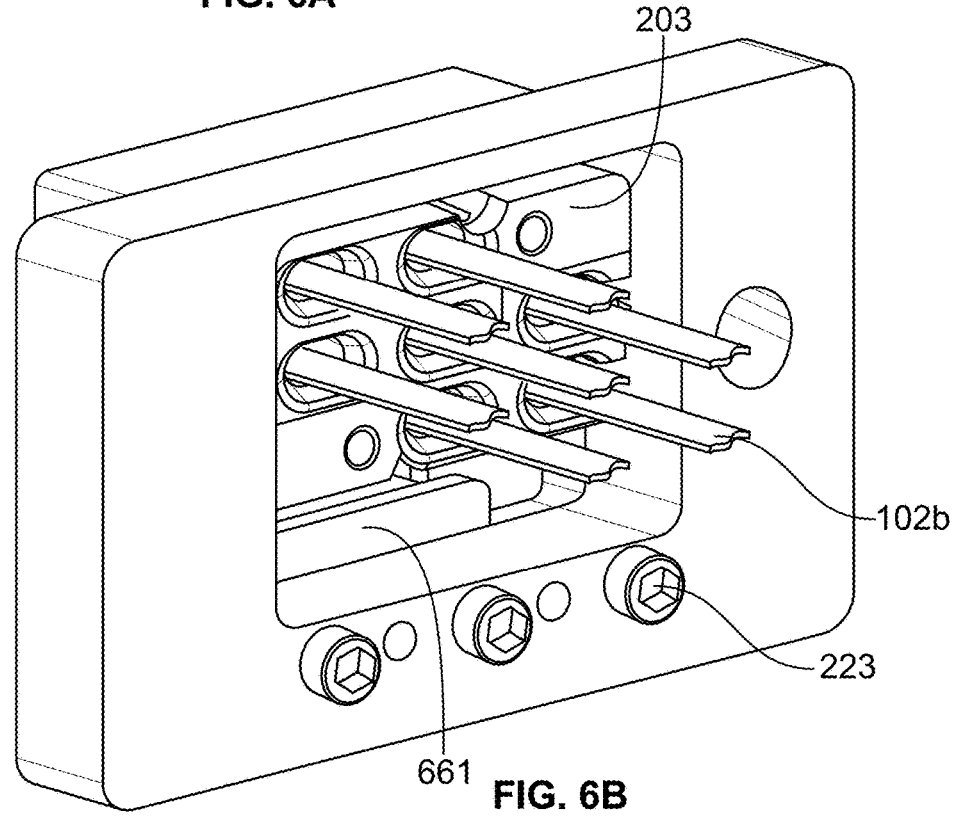
Figure 7A:
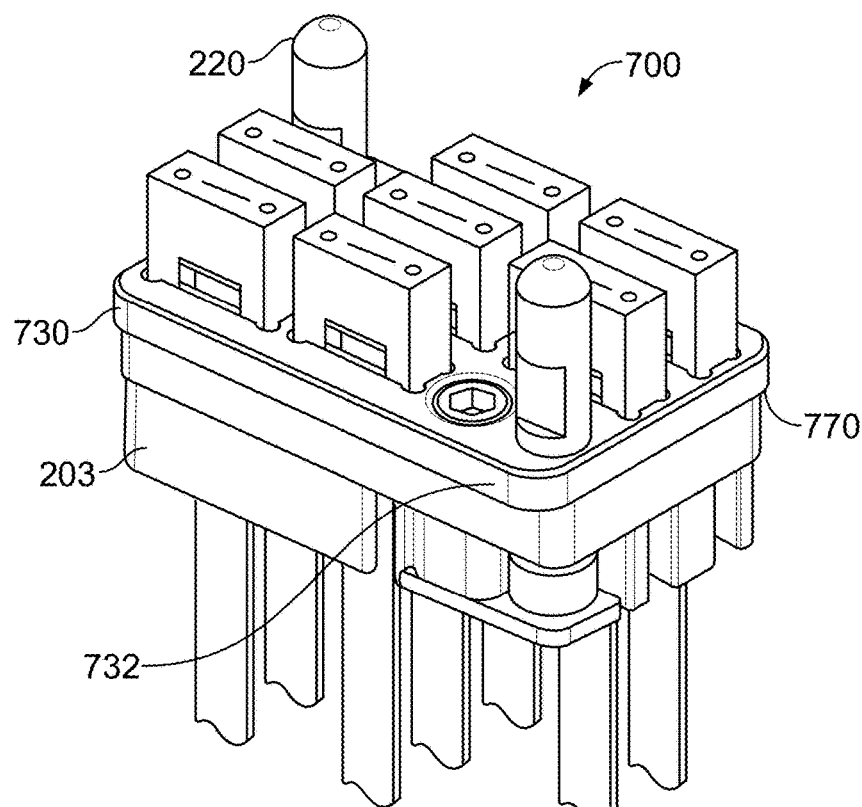
FIG. 7A shows the modularized insert assembly of FIGS. 6A and 6B.
Figure 7B:
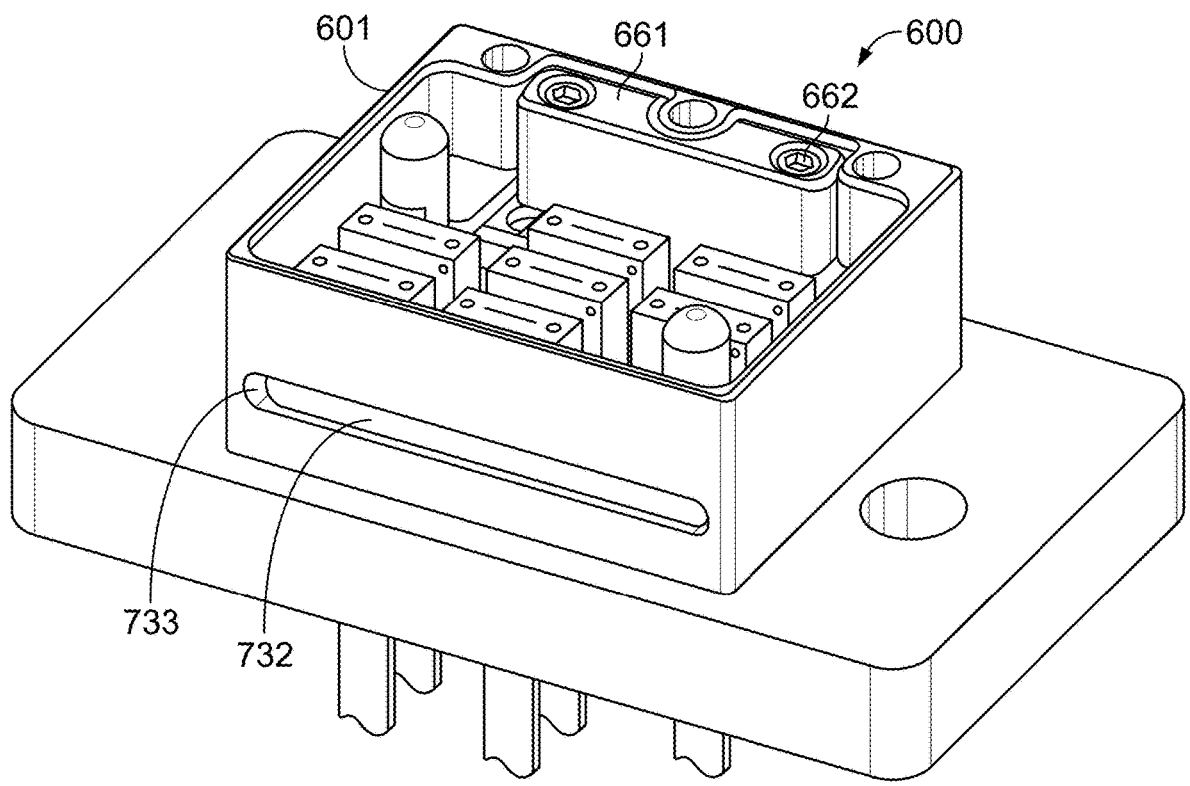
FIG. 7B shows the modularized insert assembly of FIG. 7A installed in a shell connector mounted on a backplane.
Figure 8B:
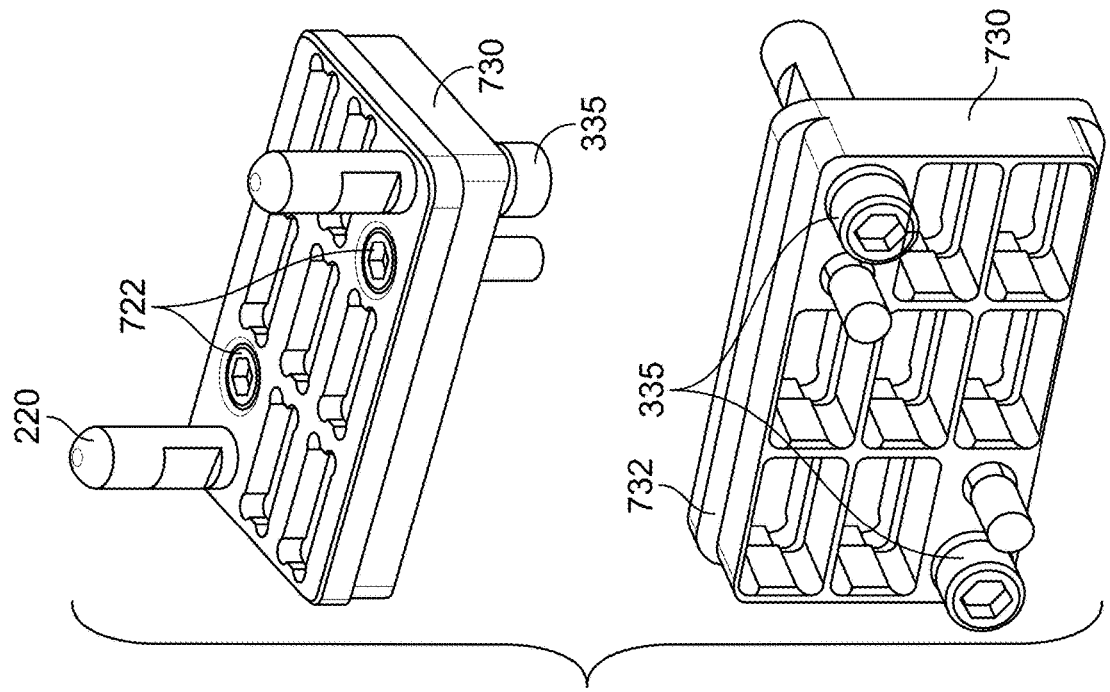
FIGS. 8A-8C show different components of the connector assembly of FIG. 6A.
Figure 8A:
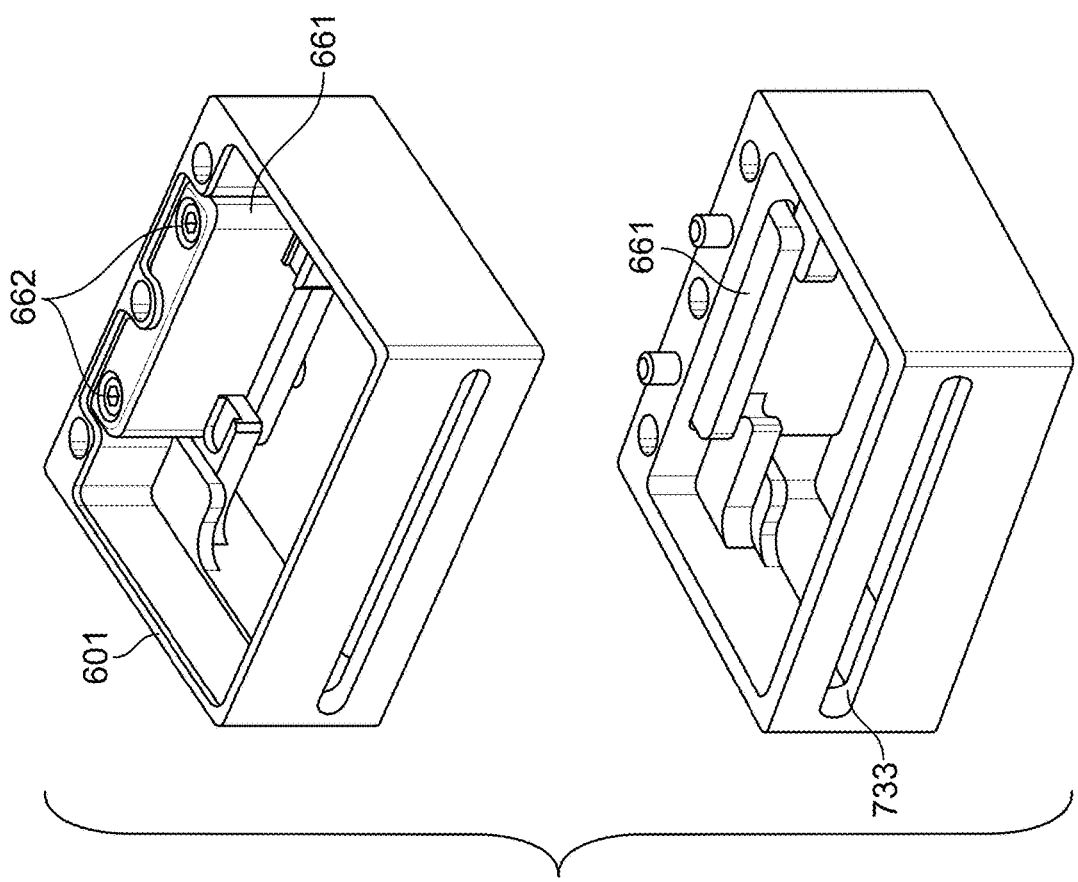
Figure 8C:
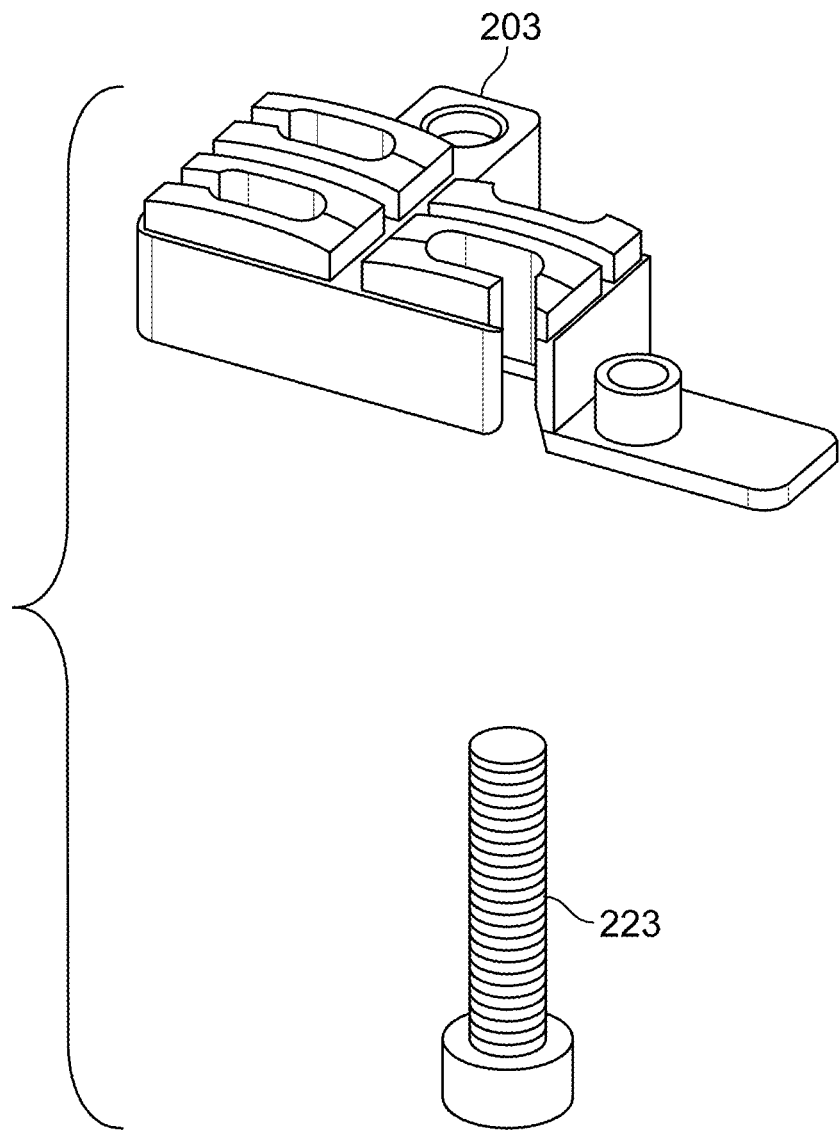

Referring to FIGS. 8A-C, the different components of the connector assembly 600 of FIG. 6A are shown. FIG. 8(A)(1) is a front view of the shell housing 601, while FIG. 8(A)(II) is a rear view of shell housing 601. The shell housing 601 comprises the bracket 661 which is secured in place by set screws 662. As shown in FIG. 8A, the bracket 661 is in the open position, meaning that it is in a position to receive the shoulder 770 of the insert housing 730. Like the embodiment of shell housing 201, shell housing 601 comprises a slot 733 to receive ridge 732 of the insert housing 730

Referring to FIG. 8B, the insert housing 730 is similar to that of insert housing 331 in that it has insert ferrule openings, alignment holes, alignment pins 220 with retention screws 335, and captive screws 722 for securing the insert housing to the retainer as described above. Also, like insert housing 331, insert housing 730 comprises a flange 732 for cooperating with the slot 733. However, unlike insert housing 331 which has threaded boreholes 441 for receiving shoulder fasteners 221, insert housing 730 comprises a shoulder 732 for cooperating with the retention bracket 661 as described below.

Referring to FIGS. 8C (1) and (II), the retainer 203 and mounting screw 223 are the same as those disclosed in connection with the embodiment of FIG. 2.

Figure 9B:
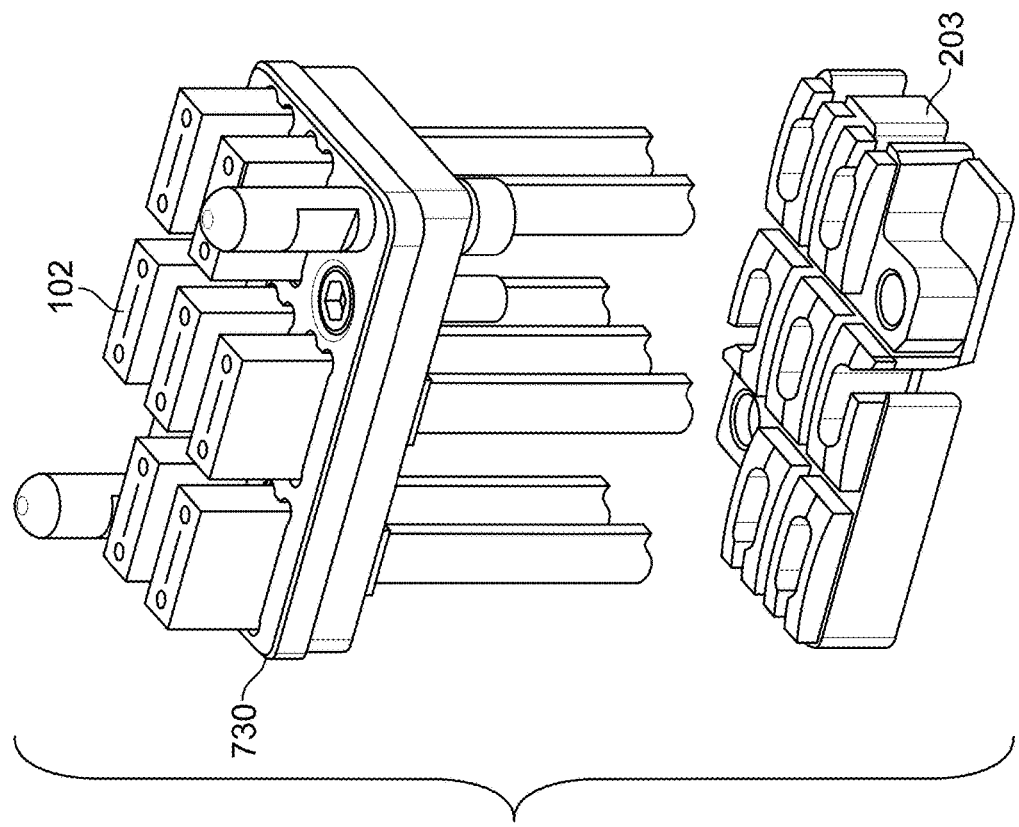
FIGS. 9A-9J show steps of one embodiment of preparing the connector assembly of FIG. 6A mounted on a backplane.
Figure 9A:
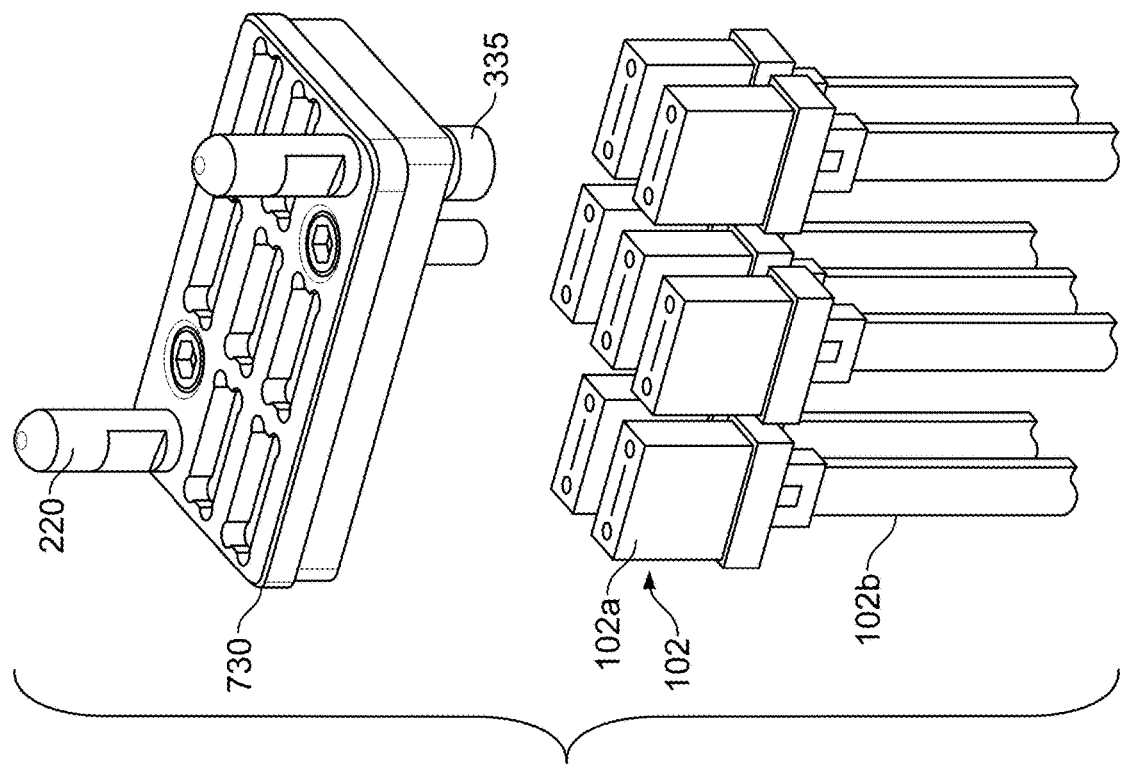
Figure 9C:
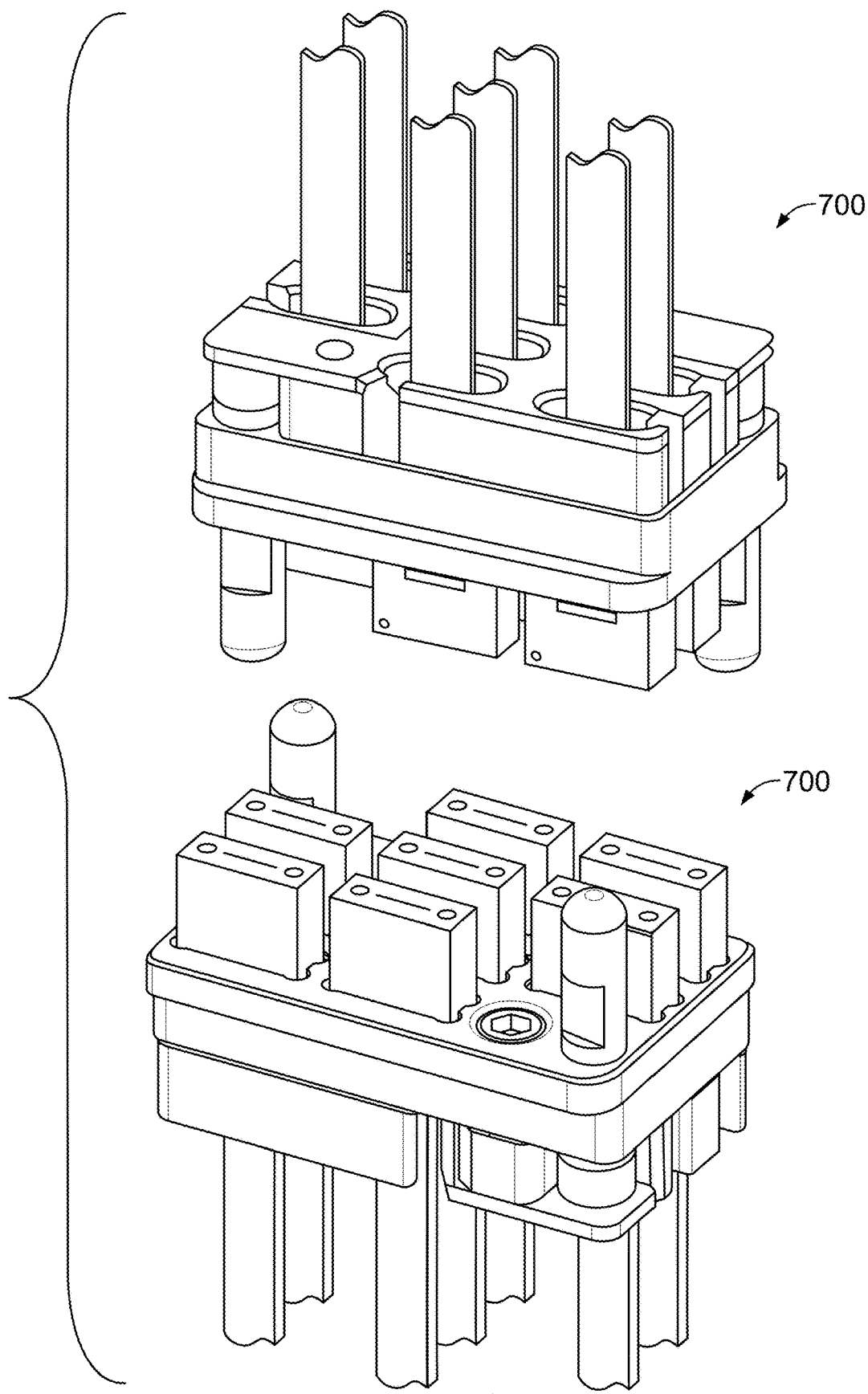

Referring to FIGS. 9a-9J, one embodiment of a process of preparing the modularized insert assembly 700 of connector assembly 600 of FIG. 6 is shown. It should be understood that this process is very similar to the process disclosed in connection with FIG. 4A-G, although the mechanism for floatably mounting the insert housing to the shell housing is different. More specifically, referring to FIG. 9A, ferrule assemblies 102 comprising ferrules 102a and cables 102b are disposed in the cavities of insert housing 730 from the rear of insert housing 730. Next, as shown in FIG. 9B, the cables 102b of ferrule assemblies 102 are disposed in their respective openings in retainer 203, and retainer 203 is then secured to insert housing 730 using screws 722 to form the modularized insert assembly 700 as shown in FIG. 9C. In this respect, FIG. 9C(1) shows a bottom perspective of the modularized insert assembly 700, while FIG. 9C(II) shows a top perspective view of the modularized insert assembly 700.

Figure 9D:
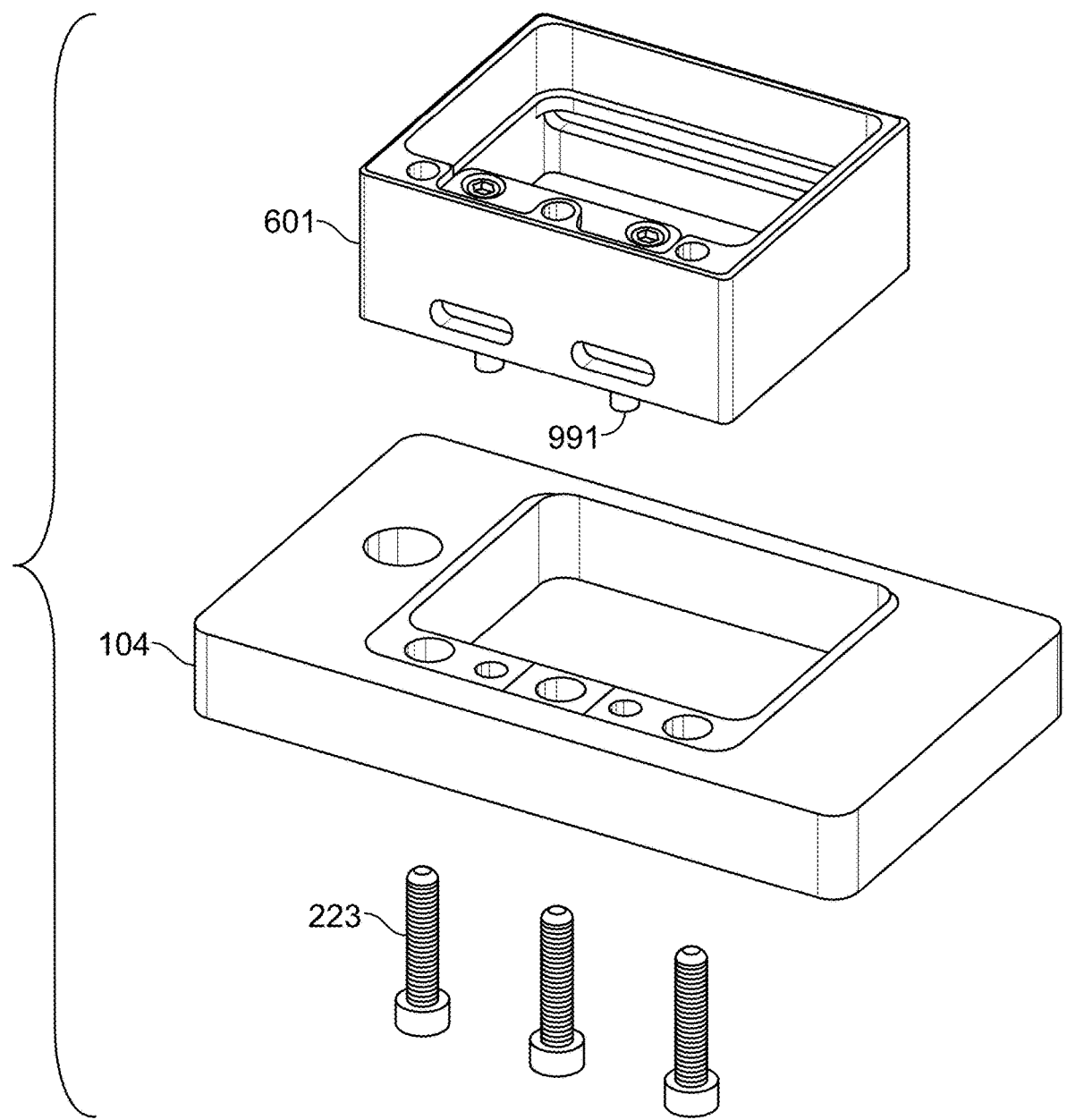

Next, in steps similar to those disclosed above, the shell housing 601 is connected to the planar surface 104 using mounting screws 223 as shown in FIGS. 9D and E.

Figure 9F:
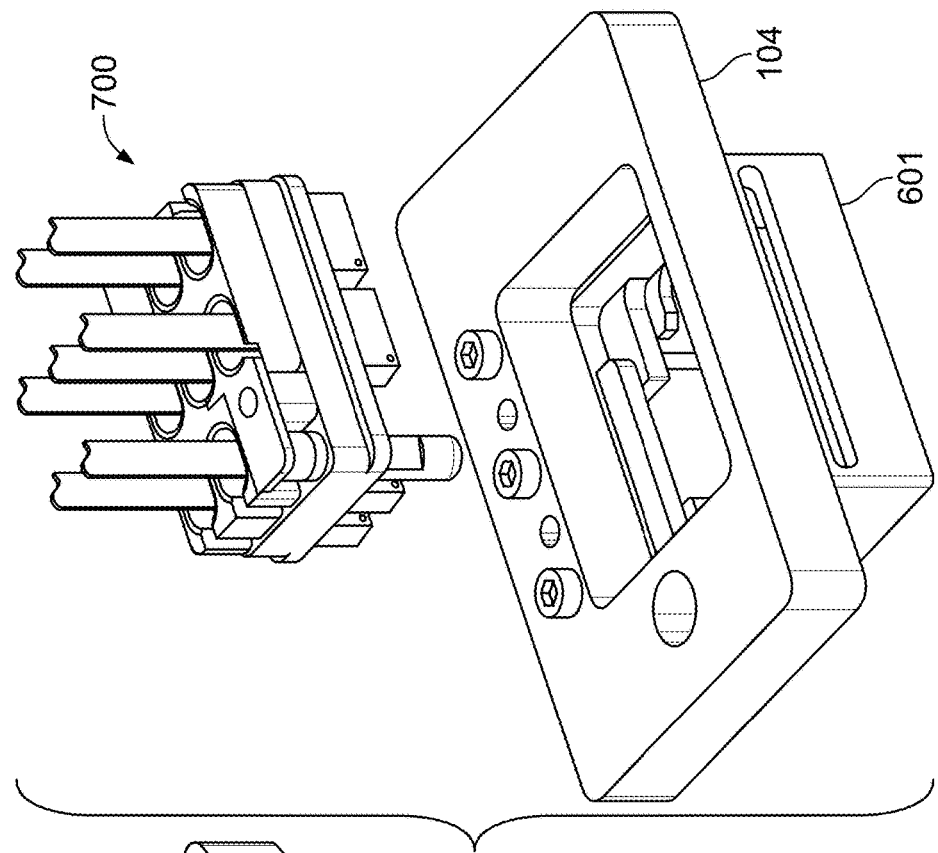
Figure 9E:
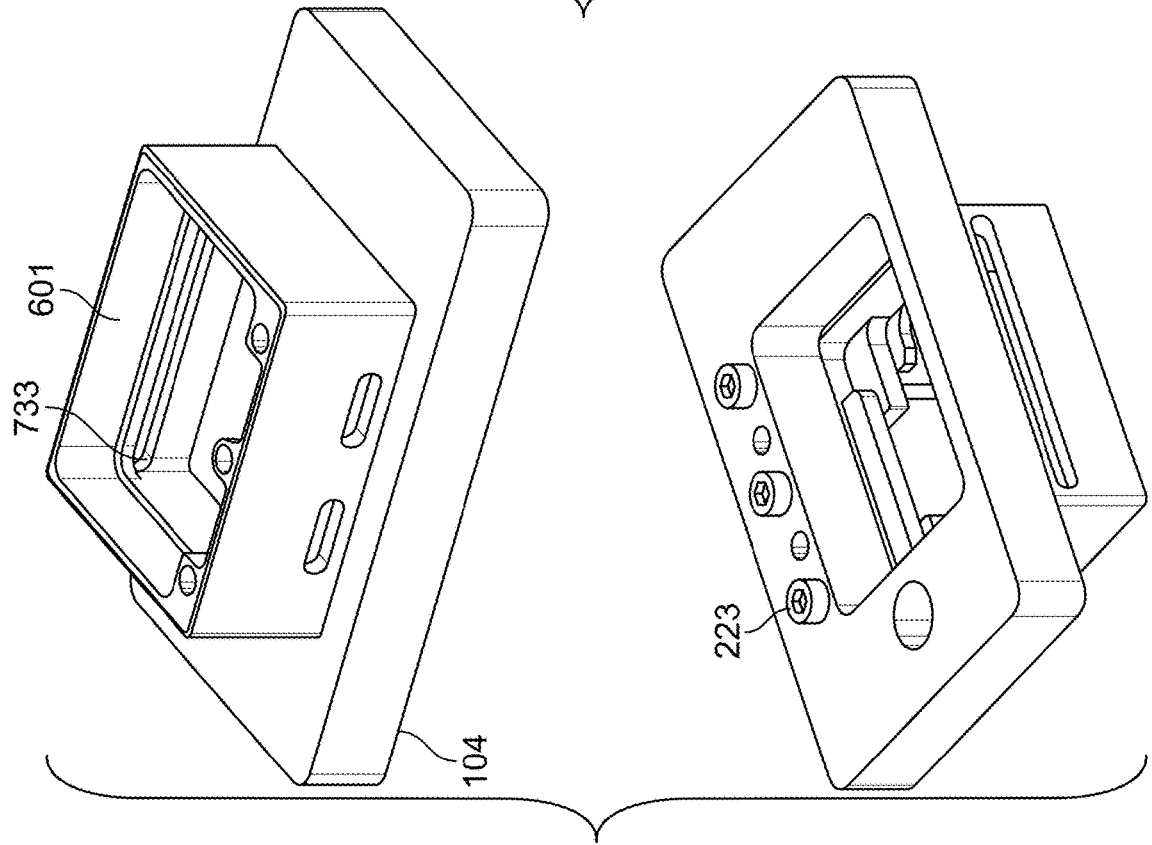
Figure 9G:
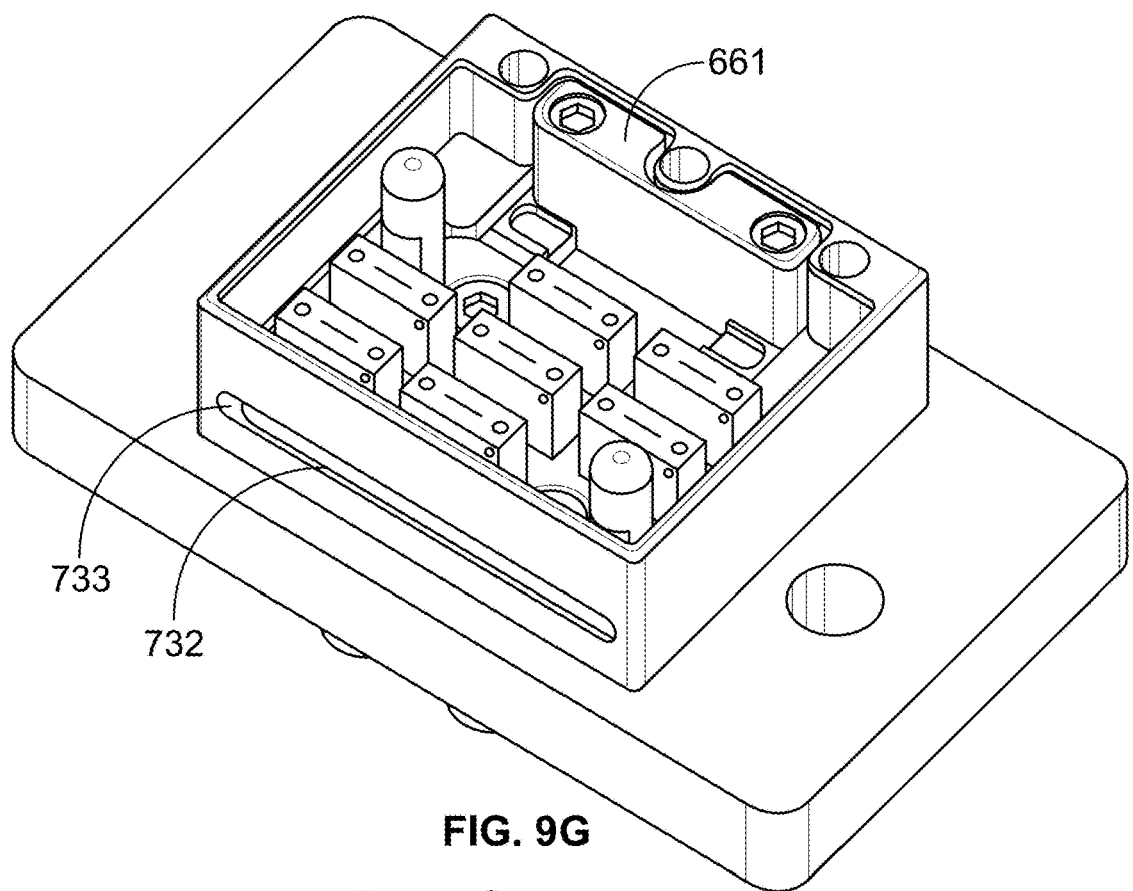

In the next step shown in FIG. 9F, the modularized insert assembly 700 is inserted into the rear of the shell housing 601 through the opening in the planar surface 104 by inserting flange 732 into slot 733 as shown in FIG. 9G.

Figure 9H:
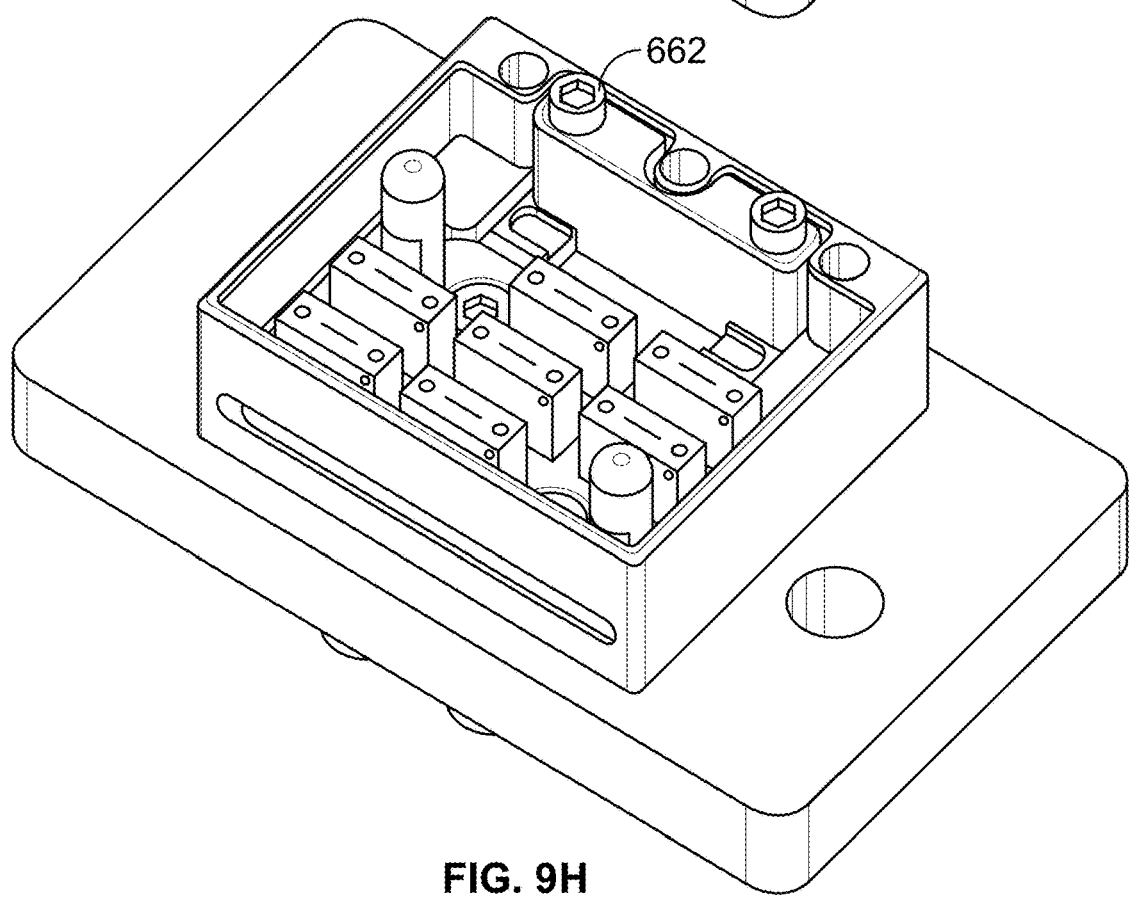
Figure 9I:
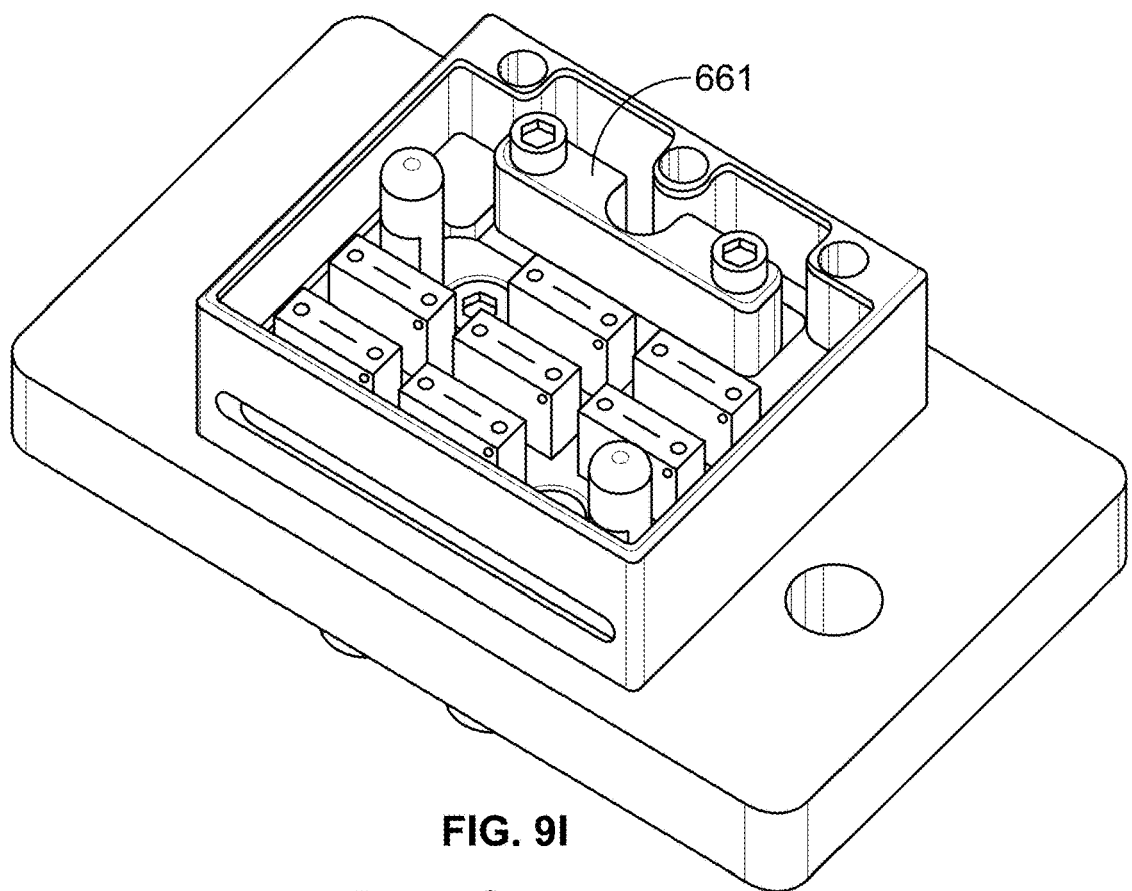
Figure 9J:
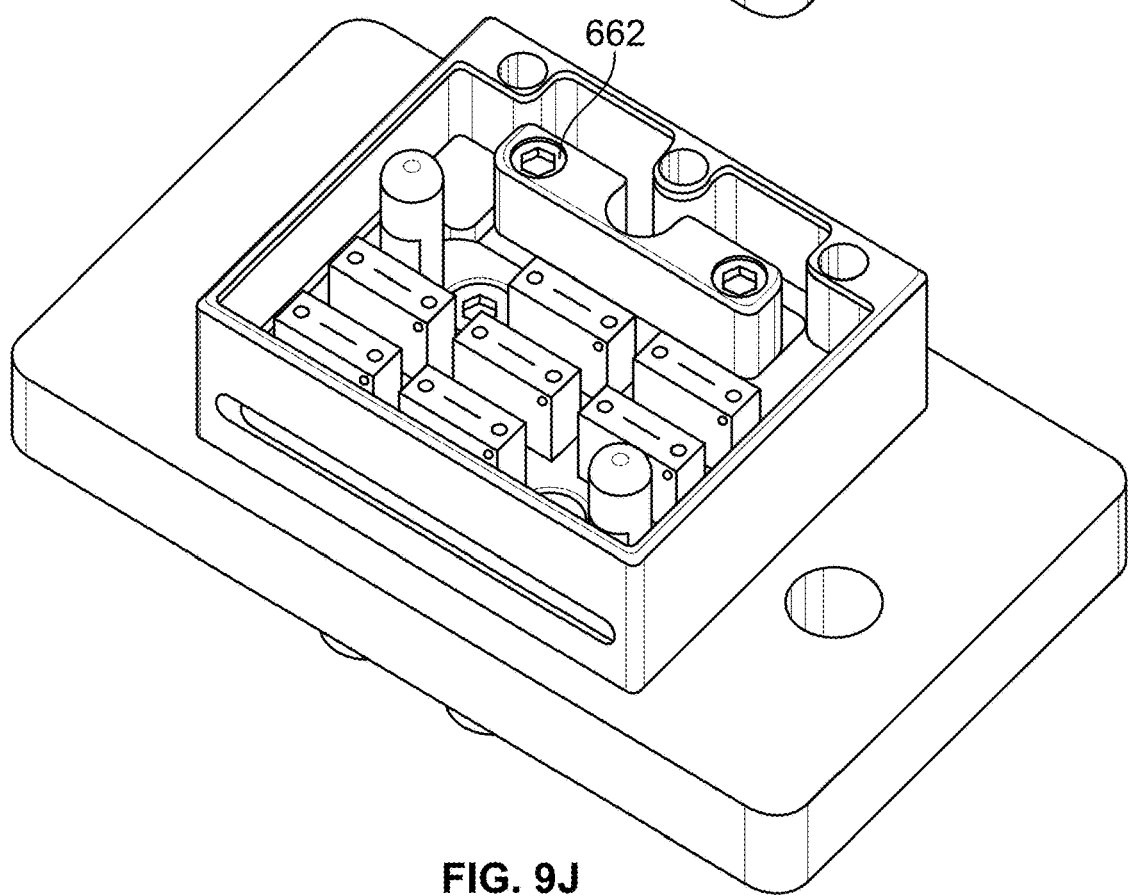

In FIG. 9H, the setscrews 662 of the bracket 661 are loosened, and then, as shown in FIG. 9I, bracket 661 is moved forward in a lock position such that it slides over the shoulder 770 of insert housing 730 to prevent the insert housing's axial movement in the shell housing. Finally, as shown in FIG. 9J, the setscrews 662 are tightened to secure the bracket 651 in this lock position. Thus, the insert housing 730 floats within the shell housing 601 in connector assembly 600 by virtue of the ridge 732/slot 733 interaction and by virtue of the bracket 662 preventing axial movement of the insert housing, but allowing lateral movement of the insert housing with respect to the housing shell as shown in more detail in FIG. 10A.

Figure 10A:
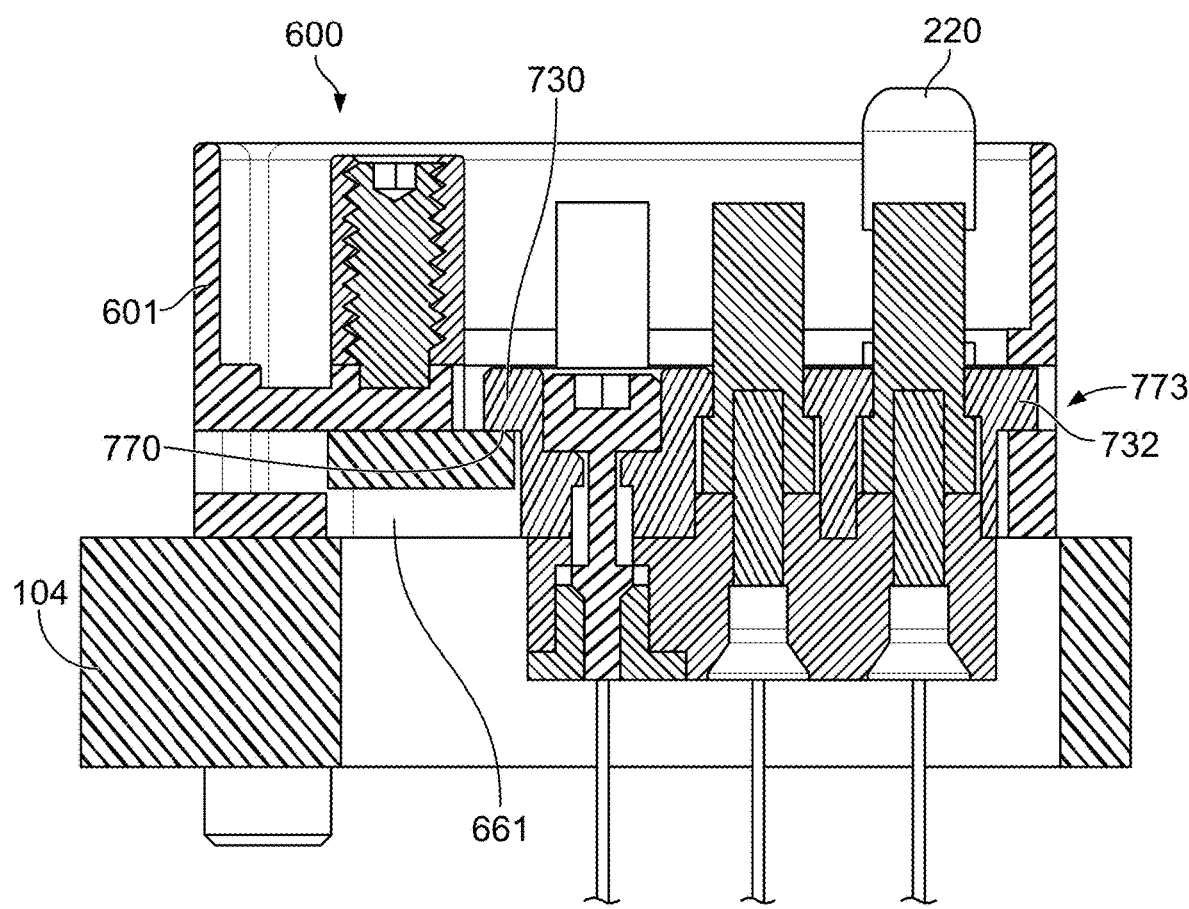
FIG. 10A shows a cross-sectional side view of the connector assembly of FIG. 6A.

Referring to FIG. 10A, a side cross-sectional view of the connector assembly 600 is shown indicating the various features described above.

Figure 10B:
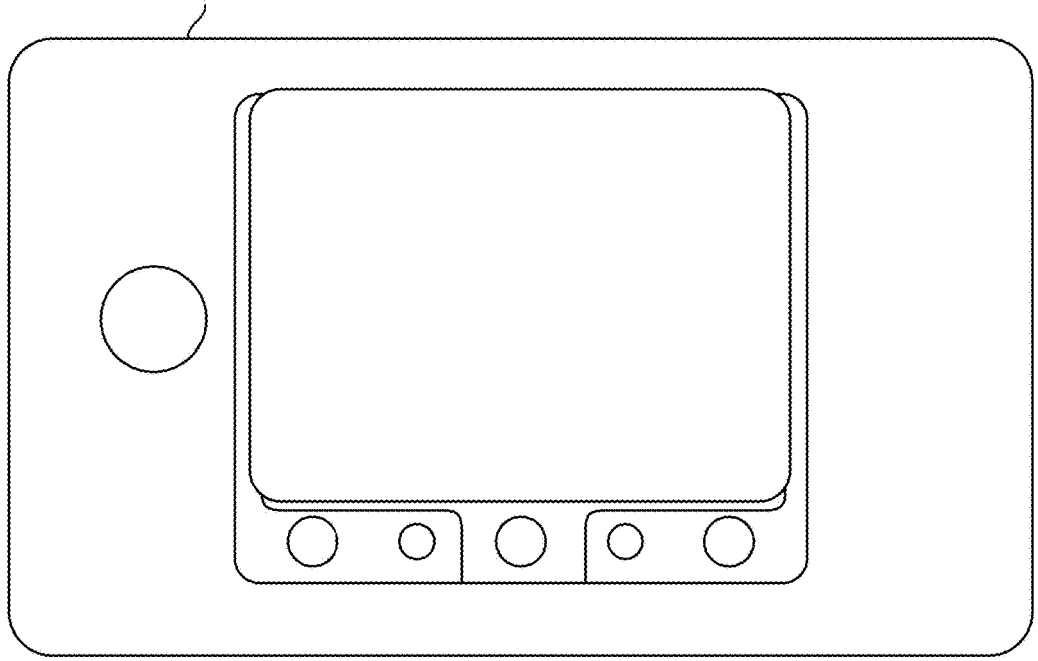
FIG. 10B shows one embodiment of the backplane to which the connector assembly is mounted.

The planar surface 104 which is typically a backplane is shown in FIG. 10B which is essentially the same as FIG. 5B.

It should be the understood that while the connector assemblies 200 and 600 shown in FIG. 2A and FIG. 6A respectively disclose different mechanisms to facilitate floatably mounting the insert housing and the shell housing, still other embodiments are possible. For example, in another embodiment, the shell housing comprises inwardly-projecting resilient tabs, which are configured to deflect outward while the insert housing is inserted in the shell housing until a shoulder of the insert housing passes the tabs, at which point the resilient tabs snap back to hold the insert housing in place. Such mechanisms are well known. Another variation comprises reversing the ridge/slot configuration of the insert housing/shell housing described above—i.e. the shell housing would instead comprise a ridge which is received in a slot in the insert housing. Still other mechanisms will be understood by those of skill in the art in light of this disclosure.

Having thus described a few particular embodiments of the invention, various alterations, modifications, and improvements will readily occur to those skilled in the art. Such alterations, modifications, and improvements as are made obvious by this disclosure are intended to be part of this description though not expressly stated herein, and are intended to be within the spirit and scope of the invention. Accordingly, the foregoing description is by way of example only, and not limiting. The invention is limited only as defined in the following claims and equivalents thereto.

What is claimed is:

1. A connector for attachment to a planar surface, said connector comprising:
    a shell housing configured for attachment to said planar surface;
    an insert housing connected to said shell housing and defining two or more insert ferrule openings, wherein said shell housing and said insert housing are configured for ridge/slot interengagement in which a ridge of said shell housing or said insert housing is received in a slot of said shell housing or said insert housing; at least one retainer attached to said insert housing and defining two or more retainer ferrule openings aligned with said insert ferrule openings; and
    two or more ferrule assemblies disposed within said two or more insert ferrule openings.

2. The connector of claim 1, wherein said insert housing is floatably mounted in said shell housing.

3. The connector of claim 2, wherein said insert housing comprises said ridge, and said shell housing comprises said slot configured to receive said ridge.

4. The connector of claim 2, wherein said shell housing comprises floating fasteners and wherein said insert housing is configured to receive said floating fasteners.

5. The connector of claim 2, wherein said shell housing comprises a bracket having an open and locked position, and wherein said insert housing comprises a shoulder configured to abut said bracket when said bracket is in said locked position.

6. The connector of claim 1, wherein said two or more insert ferrule openings comprise at least five insert ferrule openings.

7. The connector of claim 1, wherein said shell housing comprises at least one protrusion for cooperating with a corresponding recess in said planar surface to register the position of said shell housing on said planar surface.

8. A modularized insert assembly for connection to a shell housing, said insert assembly comprising:
    an insert housing configured to be floatably mounted within said shell housing, said insert housing defining two or more insert ferrule openings, wherein said shell housing and said insert housing are configured for ridge/slot interengagement in which a ridge of said shell housing or said insert housing is received in a slot of said shell housing or said insert housing;
    at least one retainer attached to said insert housing and defining two or more retainer ferrule openings aligned with said insert ferrule openings; and
    two or more ferrule assemblies disposed within said two or more insert ferrule openings.

9. The modularized insert assembly of claim 8, wherein said insert housing comprises at least one insert housing alignment pin opening and at least one fastener opening, wherein said at least one retainer comprises at least one retainer fastener opening, wherein at least one alignment pin is disposed in said at least one insert housing alignment pin opening for providing blind-mating capability, and wherein at least one fastener is disposed in said at least one fastener opening and at least one retainer fastener opening, thereby securing and aligning said at least one retainer to said insert housing.

10. The modularized insert assembly of claim 8, wherein said insert housing comprises said ridge which is configured to be received in said slot of said shell housing.

11. The modularized insert assembly of claim 8, wherein said insert housing is configured with boreholes to receive floating fasteners of said shell housing.

12. The modularized insert assembly of claim 8, wherein said insert housing comprises a shoulder configured to abut a bracket of said shell housing.

13. The modularized insert assembly of claim 8, wherein said two or more insert ferrule openings comprise at least five insert ferrule openings.

14. A method of preparing a connector assembly mounted on a planar surface, said connector assembly comprising a shell housing and an insert housing, said insert housing defining two or more insert ferrule openings, said method comprising:

disposing two or more ferrule assemblies in said two or more insert ferrule openings;

connecting at least one retainer to said insert housing to form a modularized insert assembly; and disposing said modularized insert assembly in said shell housing, wherein said shell housing and said insert housing are configured for ridge/slot interengagement in which a ridge of said shell housing or said insert housing is received in a slot of said shell housing or said insert housing.

15. The method of claim 14, wherein said insert housing comprises at least one captive insert fastener, and wherein said connecting comprises fastening said captive insert fastener to said at least one retainer, thereby aligning said insert ferrule openings with retainer ferrule openings defined in said retainer.

16. The method of claim 14, wherein disposing said modularized insert assembly in said shell housing comprises inserting said ridge of said insert housing into said slot in said shell housing.

17. The method of claim 14, wherein disposing said modularized insert assembly in said shell housing comprises fastening floating fasteners of said shell housing into said modularized insert assembly.

18. The method of claim 14, wherein disposing said modularized insert assembly in said shell housing comprises moving a bracket of said shell housing from an open position to a locked position such that said bracket abuts a shoulder of said modularized insert assembly and prevents axial movement of said modularized insert assembly relative to said shell housing.

19. The method of claim 14, wherein disposing two or more ferrule assemblies in said two or more insert ferrule openings comprises disposing five or more ferrule assemblies in five or more insert ferrule openings.

* * * * *